United States Patent [19]
Yoshizawa et al.

[11] Patent Number: 5,317,937
[45] Date of Patent: Jun. 7, 1994

[54] CONTROL SYSTEM FOR VEHICLE AUTOMATIC TRANSMISSION

[75] Inventors: Hiroshi Yoshizawa; Hideo Fukushi; Hideo Furukawa; Hiroshi Ishikawa; Takafumi Maruyama; Satoru Sunada; Keiichi Ishikawa, all of Saitama, Japan

[73] Assignee: Honda Giken Kogyo Kabushiki Kaisha, Tokyo, Japan

[21] Appl. No.: 930,287

[22] Filed: Aug. 17, 1992

[30] Foreign Application Priority Data

| Sep. 14, 1991 | [JP] | Japan | 3-263013 |
|---|---|---|---|
| Sep. 14, 1991 | [JP] | Japan | 3-263015 |
| Sep. 14, 1991 | [JP] | Japan | 3-263016 |
| Sep. 14, 1991 | [JP] | Japan | 3-263017 |
| Sep. 14, 1991 | [JP] | Japan | 3-263018 |
| Sep. 14, 1991 | [JP] | Japan | 3-263020 |
| Sep. 14, 1991 | [JP] | Japan | 3-363019 |
| Nov. 28, 1991 | [JP] | Japan | 3-339779 |
| Nov. 28, 1991 | [JP] | Japan | 3-339780 |

[51] Int. Cl.$^5$ ............................................ F16H 59/48
[52] U.S. Cl. ................................................. 477/120
[58] Field of Search ........................ 74/866; 364/424.1

[56] References Cited

U.S. PATENT DOCUMENTS

| 4,102,222 | 7/1978 | Miller et al. | 74/866 |
|---|---|---|---|
| 4,285,252 | 8/1981 | Yamaki et al. | 74/866 |
| 4,312,249 | 1/1982 | Hau et al. | 74/866 |
| 4,599,917 | 7/1986 | Leorat et al. | 74/866 |
| 4,788,892 | 12/1988 | Komoda et al. | 74/866 |
| 4,831,898 | 5/1989 | Miyawaki | 74/866 |
| 4,976,170 | 12/1990 | Hayashi et al. | 74/866 |
| 4,996,893 | 3/1991 | Nakamura et al. | 74/866 |
| 5,076,116 | 12/1991 | Sasaki | 74/866 |
| 5,083,480 | 1/1992 | Abo et al. | 74/866 |
| 5,086,669 | 2/1992 | Fujiwara et al. | 74/866 |
| 5,113,719 | 5/1992 | Suzuki et al. | 74/866 |
| 5,121,657 | 6/1992 | Asada | 74/866 |
| 5,129,288 | 7/1992 | Sasaki et al. | 74/866 |
| 5,133,232 | 7/1992 | Kikuchi et al. | 74/890 |
| 5,150,635 | 9/1992 | Minowa et al. | 74/866 |
| 5,152,192 | 10/1992 | Koenig et al. | 74/862 |
| 5,162,997 | 11/1992 | Takahashi | 364/424.05 |
| 5,182,969 | 2/1993 | Goto et al. | 74/866 |

*Primary Examiner*—Dirk Wright
*Attorney, Agent, or Firm*—Armstrong, Westerman, Hattori, McLeland & Naughton

[57] ABSTRACT

A control system of a vehicle automatic transmission in which an engine load and a vehicle speed are detected and used to determine a vehicle acceleration in accordance with the pre-established characteristics. An actual vehicle acceleration is at the same time calculated in response to the detected vehicle speed. The difference therebetween is then calculated and the calculated value is added to a difference calculated earlier to obtain an average therebetween. Five gear shifting scheduling maps, for example, one for moderate hill climbing, one for level-road running, one for steep hill descent, are pre-established and in response to the average obtained, one of the maps is selected. A gear shifting is controlled based on the selected map. In a pre-determined condition, such as when the engine load changes abruptly, braking is in progress and so on, the map selection is suspended and the control is carried out using the map selected earlier.

41 Claims, 27 Drawing Sheets

Predicted acceleration table

Map for level-road running
(shift characteristics)

Map for moderate hill climbing (shift characteristics)

MAPS 0 : Steep hill climbing (SHC)
1 : Moderate hill climbing (MHC)
2 : Level-road running (LRR)
3 : Moderate hill descent (MHD)
4 : Steep hill descent (SHD)

FIG. 18

| | PN001 | 0←1<br>PN010 | 1←0<br>PN012 | PN021 | PKU23 | PKU32 | PKU34 | PKU43 |
|---|---|---|---|---|---|---|---|---|
| Max MAPS  MAPS2 | 0 | 1 | 2 | 2 | 3 | 3 | 4 | 4 |
| Min MAPS  MAPS1 | 0 | 0 | 1 | 2 | 2 | 3 | 3 | 4 |
| | SHC | MHC | | LRR | | MHD | | SHD | ized map using as address data an operating
CONTROL SYSTEM FOR VEHICLE AUTOMATIC TRANSMISSION

BACKGROUND OF THE INVENTION

1. Field of the Invention

This invention relates to a control system for a vehicle automatic transmission, and more particularly to a control system for a vehicle automatic transmission which improves the gear shift control characteristics during hill climbing and descent.

2. Description of the Related Art

Most control systems for vehicle automatic transmissions use a gear shift scheduling map prepared in advance and the gear to be selected is determined by retrieval from this map using as address data an operating condition parameter indicating the engine load (e.g. the throttle opening) and an operating condition parameter indicating the vehicle speed. However, the gear shift map is based on the most commonly encountered driving conditions and is therefore not always able to provide the best gear shift characteristics under special conditions, as when driving up or down hill, for instance. A system that has been proposed for overcoming this problem is that taught by Japanese Patent Publication No. Sho 59-8698. This improved system uses separate gear shift scheduling maps (gear shift diagrams or programs) for different road profiles—one for level-road driving, another for up-hill driving, and so on. A calculation is made based on operating condition parameters such as the throttle opening and vehicle speed for predicting the value of an index of the running resistance of the vehicle on a level road. A concrete example of the index is the vehicle acceleration. The predicted acceleration is then compared with the actual acceleration calculated from the vehicle speed, and the gear to be selected is determined from the gear shift scheduling map based on the result of the comparison.

Control of this type requires the vehicle acceleration (more generally the index of running resistance) to be calculated from the engine load and other parameters with a high degree of accuracy. However, time lags in the air intake system, fuel supply system, drive train and the like produce a time lag between the occurrence of a change in engine load and the time when this change appears in the power output torque. The length of this time lag is particularly large when the engine load changes rapidly. Since it is therefore impossible to determine the index of running resistance with high accuracy during rapid changes in engine load, the gear shift control is apt to become inappropriate.

Such a difficulty in determining the index of running resistance with high accuracy also arises when a brake pedal is depressed, since engine output torque decreases in response to the braking force. Also the same will happen when gear shifting is in progress, i.e., when application and release of gear clutches takes place, or when any apparatus such as an air conditioner is equipped with which is to be driven by the vehicle engine, since engine output torque is partially consumed by the apparatus. The same also occurs when drive wheels slip which makes a vehicle speed different from a true value if the vehicle speed is detected from the rotational speed of the drive wheels. Or when range gear positions "D, D3, 2, . . . " are being switched therebetween, gear shift control characteristics will then be changed so that running resistance would be unstable.

It is therefore one object of this invention to provide a control system for a vehicle automatic transmission which overcomes the aforesaid drawbacks of the prior art system and is able to prevent erroneous control based on erroneous determination of the index of running resistance.

The prior art system also has shortcomings in that the need to predict the vehicle acceleration separately for each gear position makes them intrinsically complex and in that the method it employs for switching between different gear shift characteristics in response to the difference between the predicted and actual accelerations is apt to result in instable control in which the control value changes frequently, particularly during times when the vehicle operating conditions change rapidly.

It is therefore another object of the invention to provide a control system for a vehicle automatic transmission which eliminates these disadvantages of the prior art system.

Moreover, as mentioned above, braking will affect the determination of the index of running resistance. As regards the braking, due to a clearance between a brake disc and a brake pad or due to a play of a brake pedal, there is a time lag in the brake pedal depression and braking force resulted therefrom and thus, the braking force remains for a period after the brake pedal was released. The braking signal is frequently used in many controls including automatic transmission control and since it is expensive to prepare a sensor which can detect braking condition through hydraulic pressure of an brake oil, for example, such a sensor is usually used to detect braking condition as is turned on when a brake lamp is switched on or when the brake pedal is depressed. As a result, when the latter type of sensor is used, it could erroneously detect that braking condition ends at a time when the brake pedal is released.

It is therefore further object of the invention to provide a control system for a vehicle automatic transmission which eliminates the aforesaid shortcomings.

Further, as mentioned earlier, the index of running resistance could not be determined accurately when gear shifting is in progress. On the other hand, if a vehicle stops temporarily during hill descending and then starts once again, gear should preferably be shifted up to the top in a short period when vehicle continues rapid acceleration. Therefore, if the gear shift control is discontinues each time gear shifting is in progress, upshifting could be delayed, resulting another problem.

It is therefore still further object of the invention to provide a control system for a vehicle automatic transmission which solves the problem just mentioned above.

Furthermore, slippage in drive wheels could bring a problem in determining the index of running resistance accurately as referred to earlier. A traction control system is often introduced to control engine output in a situation such as the drive wheel's slippage. And if the traction control system is provided with and if the traction control system operates frequently, a road on which the vehicle travels could be quite different from that the aforesaid gear shift scheduling maps do expect.

It is therefore still further object of the invention to provide a control system for a vehicle automatic transmission which copes with a traveling condition in which the traction control system operates frequently.

Furthermore, when driving down hill, a gear shift scheduling map for hill descending is selected in the prior art system to facilitate hill descending by providing a better engine braking response. (The term "engine braking" or "engine brake" appeared in the specification means a condition in which a vehicle engine is driven by vehicle wheels so that the vehicle slows down its speed.) However, when running down a gentle or moderate slope, the necessity of engine braking is not so high and what is more, the engine speed becomes greater in low gear than that in high gear. This could make engine noisy, degrading a drive feeling.

It is therefore yet still further object of the invention to provide a control system for a vehicle automatic transmission which eliminates the disadvantage of the prior art system.

SUMMARY OF THE INVENTION

This invention achieves the aforementioned by providing a control system for a vehicle automatic transmission comprising a system for controlling an automatic transmission of a vehicle, comprising first means for detecting operating conditions of the vehicle including an engine load and a vehicle speed, second means for obtaining an index indicative of a running resistance of the vehicle based on the detected operating condition, third means for comparing the index with a reference value to determine if the vehicle is hill climbing or hill descending and control means for changing a gear shifting characteristic adapted to be hill climbing or hill descending in response to the determination to carry out a gear shifting control for hill climbing or hill descending in accordance with the changed gear shifting characteristic. In the system, said control means discontinues carrying out the gear shifting control for hill climbing or hill descending when the vehicle operation is in a specific condition.

BRIEF EXPLANATION OF THE DRAWINGS

These and other objects and advantages of the invention will be more apparent from the following description and drawings, in which:

FIG. 18 is an explanatory view showing the result of selection conducted along the subroutine of FIG. 16 flow chart;

DETAILED DESCRIPTION OF THE PREFERRED EMBODIMENTS

Figure 1:
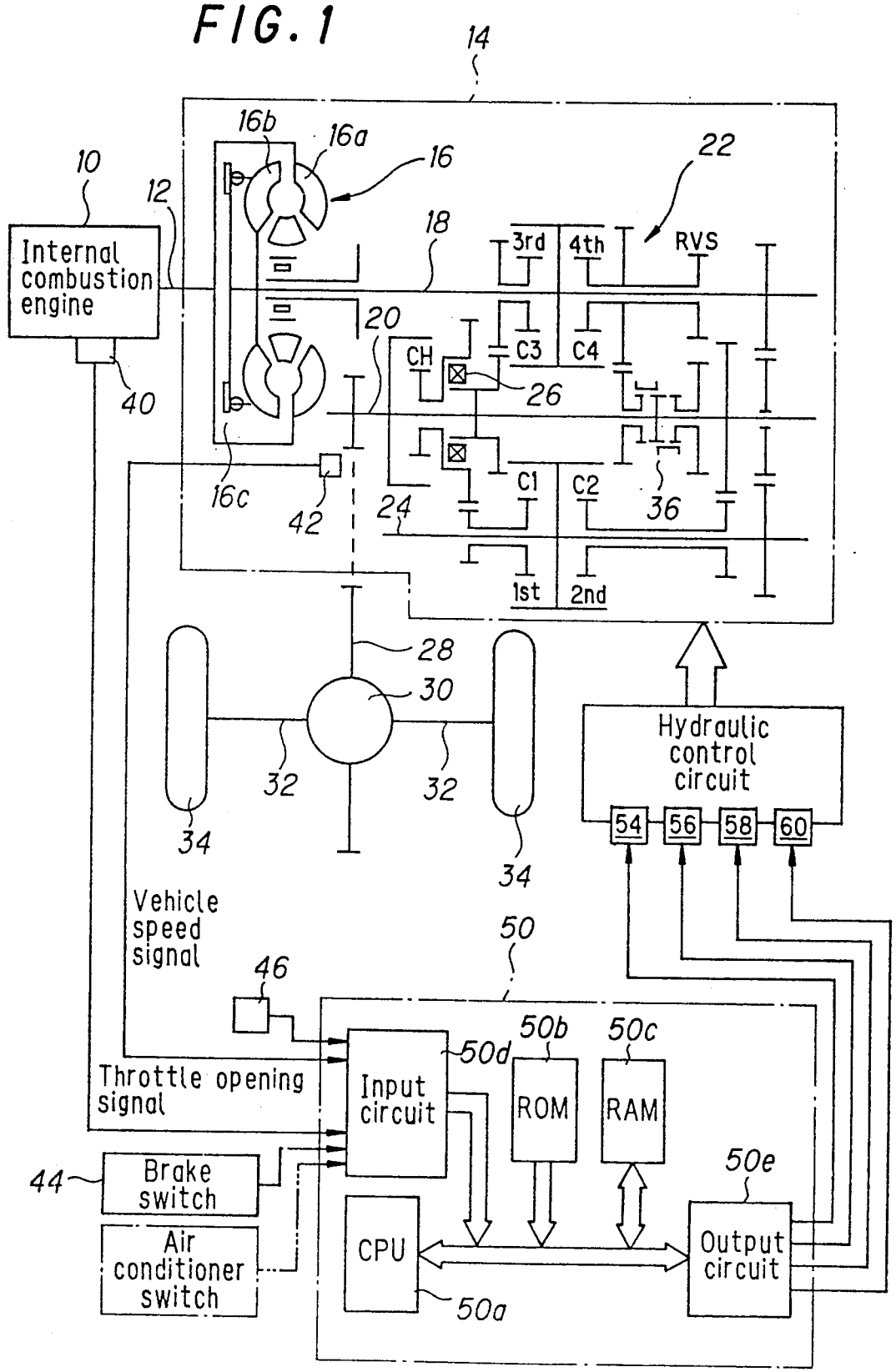
FIG. 1 is an explanatory view showing the overall schematic illustration of a control system of an a vehicle automatic transmission.

In the overall schematic illustration of the control system for a vehicle automatic transmission according to the invention shown in FIG. 1, the output of an internal combustion engine 10 is transmitted via a shaft 12 to a transmission 14 wherein it is passed on to a main shaft 18 through a pump impeller 16a and a turbine runner 16b of a torque convertor 16. A gear unit 22 with four forward speeds and one reverse speed is positioned between the main shaft 18 and a countershaft 20, and a secondary shaft 24 is disposed in parallel with the countershaft 20. The gear stages are equipped with hydraulic clutches C1-C4. The reference symbol CH in the drawing designates a hydraulic clutch for bypassing a one-way clutch 26. The output of the transmission is forwarded through a final gear 28 to a differential 30 from where it is transmitted to drive wheels 34 via drive shafts 32. The hydraulic clutch C4 is used in both forward and reverse operation. When a selector 36 is position on the left as seen in the drawing, the fourth forward gear is activated, and when it is positioned on the right, the reverse gear RVS is activated via an idle gear (not shown).

The opening of a throttle valve (not shown) located in the air intake passage (not shown) of the internal combustion engine 10 is detected by a throttle position sensor 40 and the road speed of the vehicle is detected from the speed of the countershaft 20 of the transmission 14 by a vehicle speed sensor 42 located in the vicinity of the countershaft 20. In addition, a brake switch 44 is provided near the brake pedal (not shown) for detecting whether or not the brakes are being applied and a range selector switch 46 is provided near a range selector (not shown) installed on the floor of the vehicle near the driver's seat for detecting which of seven ranges (P, R, N, D4, D3, 2 and 1) the driver has selected. The outputs of the throttle position sensor 40 etc. are sent to an ECU (electronic control unit) 50.

The ECU 50 is constituted as a microcomputer comprising a CPU (central processing unit) 50a, a ROM (read-only memory) 50b, a RAM (random access memory) 50c, an input circuit 50d and an output circuit 50e. The outputs of the aforesaid sensors and switches are input to the microcomputer through the input circuit 50d. As explained in detail later, the CPU 50a of the microcomputer decides the gear position using a gear shift scheduling map selected in accordance with the road profile and outputs signals through the output circuit 50e for energizing/deenergizing solenoid valves 54, 56 of a hydraulic control circuit so as to operate shift valves (not shown) for engaging/disengaging the hydraulic clutch of the selected gear. (The solenoid valves 58, 60 shown in the drawing are for on/off control of a lock-up mechanism 16c of the torque convertor 16.)

Figure 3:
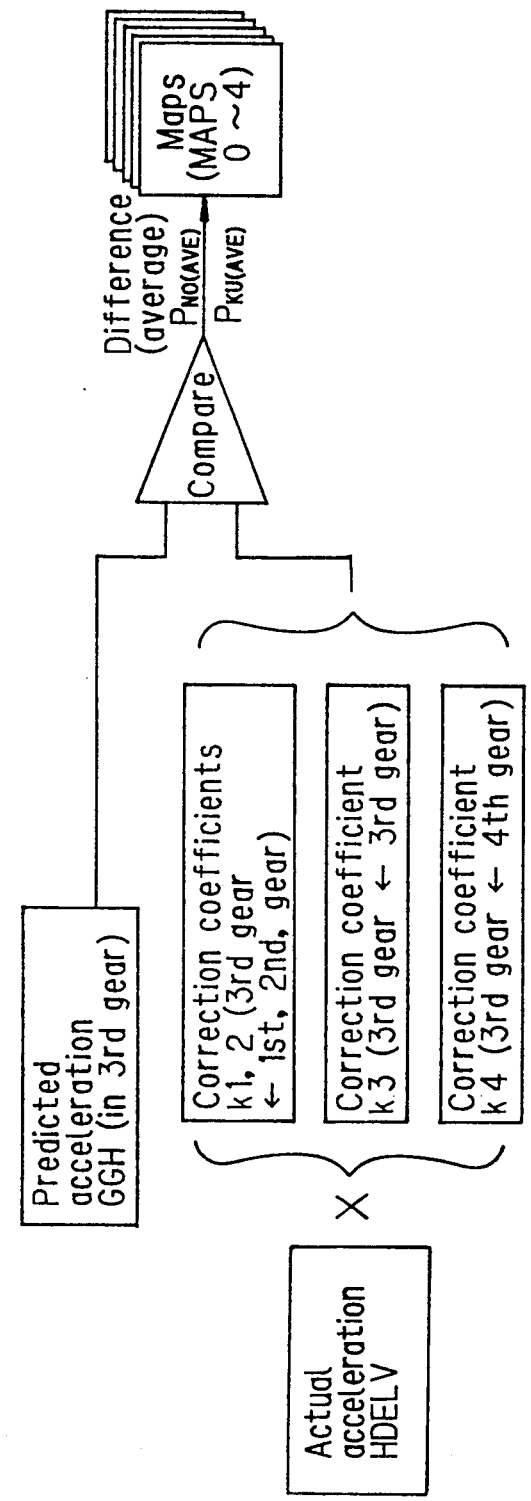
FIG. 3 is an explanatory view showing the main feature of the control system according to the invention including gear shift scheduling maps to be selected.
Figure 4:
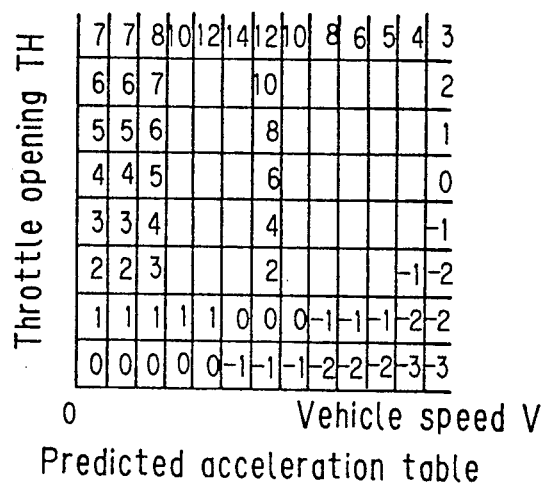
FIG. 4 is an explanatory view showing characteristics of a predicted acceleration of a vehicle to be used for gear shift scheduling map selection.
Figure 5:
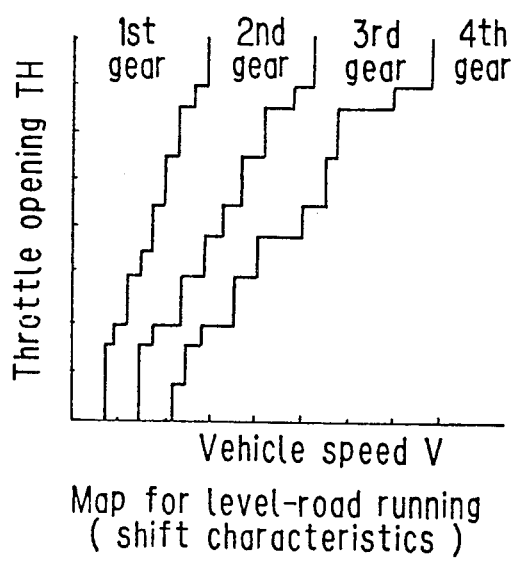
FIG. 5 is in an explanatory view showing the characteristics of the gear shift scheduling map for level-road running.
Figure 6:
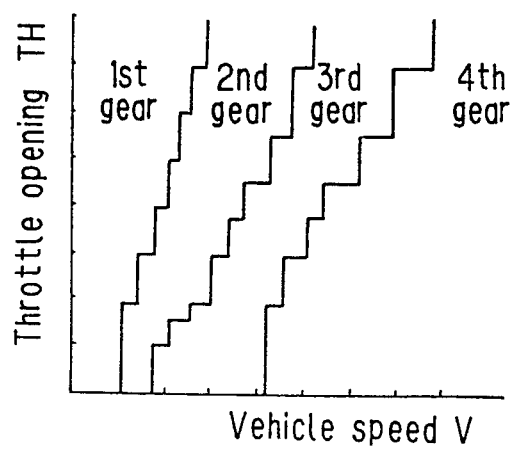
FIG. 6 is an explanatory view showing the characteristics of another gear shift scheduling map for moderate hill climbing.
Figure 7:
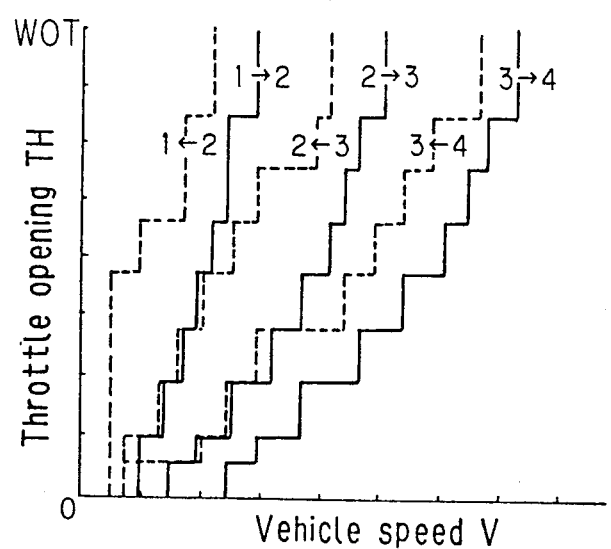
FIG. 7 is an explanatory view showing hystereses for upshifting and downshifting in the maps.

The operation of the control system will now be explained with reference to the flow chart of FIG. 2. First, however, a brief explanation of the main features of the control system will be given with reference to FIG. 3. The predicted acceleration of the vehicle (in third gear only) during level-road running is defined in advance as a function of the throttle opening and the engine speed. On the other hand, the actual acceleration of the vehicle calculated from the same parameters is multiplied by a coefficient for correcting it to a value corresponding to that in third gear. The predicted acceleration and the actual acceleration are compared with each other to obtain differences PNO, PKU, the average values of which are used for selecting (switching to) the appropriate gear shift scheduling map. The predicted acceleration is retrieved from a look-up table stored in the ROM 50b of the ECU 50 using the throttle opening and the vehicle speed as address data. Characteristics of such a table is shown in FIG. 4. The reason for defining the predicted acceleration as a function of throttle opening and vehicle speed is that under identical driving conditions, specifically the same speed, gear and road profile conditions etc., the acceleration obtained varies with the motive power (i.e. with the engine load), while the driving resistance, especially the aerodynamic drag, varies with the vehicle speed. Five types of gear shift scheduling maps are prepared, one each for steep hill climbing, moderate hill climbing, level-road running, moderate hill descent and steep hill descent. FIG. 5 shows the characteristics of the map for level-road running and FIG. 6 those of the map for moderate hill climbing (in which it will be noted that the third-gear range is broader than that in the map for level-road running). While omitted from FIGS. 5 and 6 in the interest of simplification, as shown in FIG. 7, hystereses are established in both the upshifting and downshifting directions of each map.

Figure 2:
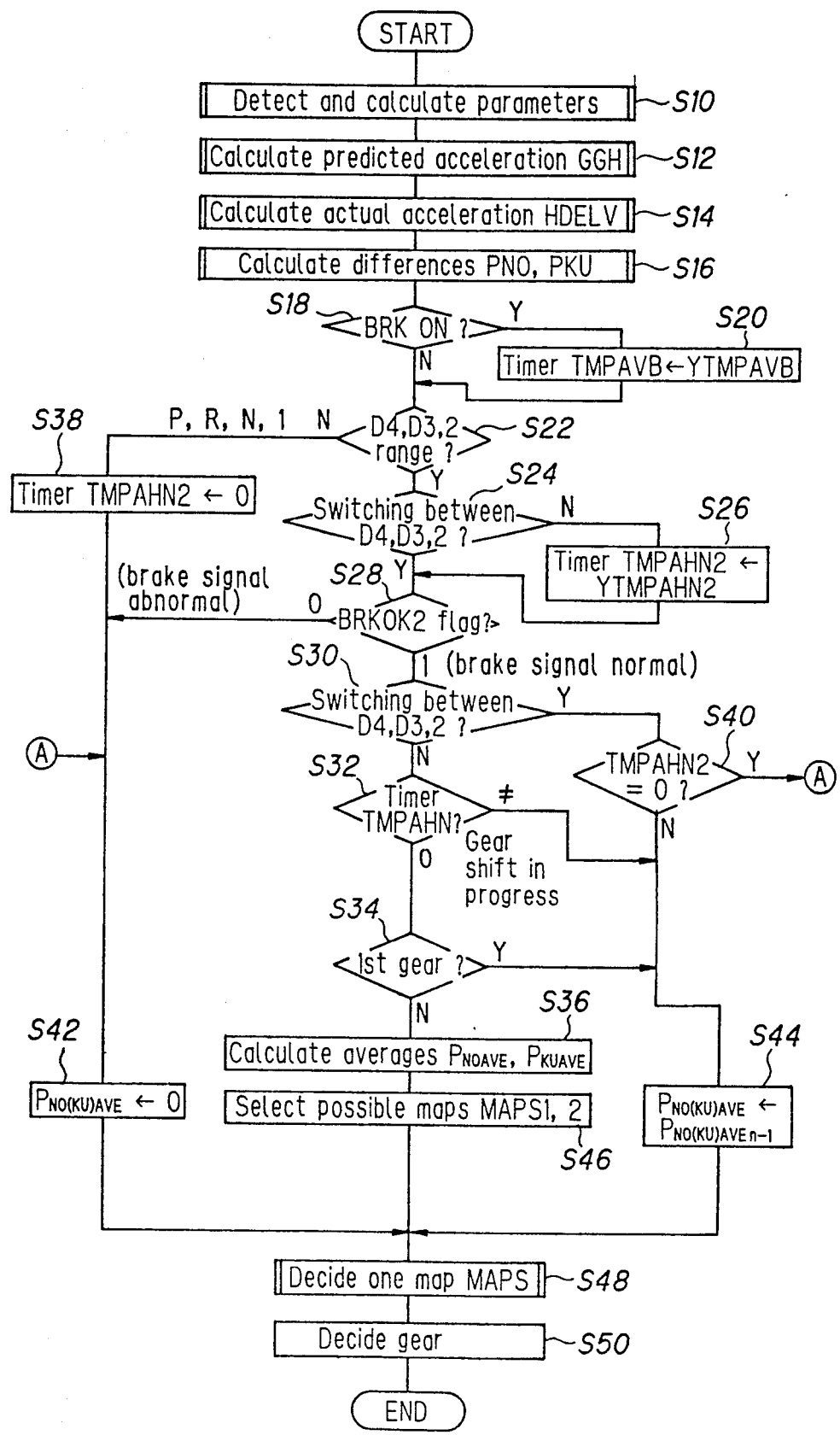
FIG. 2 is a main flow chart showing operation of the system shown in FIG. 1.

Returning to the flow chart of FIG. 2, the routine starts with step S10 in which the required parameters are obtained. The throttle opening and other such parameters are obtained as the sensor outputs themselves and the vehicle speed is calculated from the number of output pulses of the vehicle speed sensor 42 per prescribed period of time. However, as the change pattern of the throttle opening is also determined in this step, the processing for this will be explained with reference to FIG. 8. (The routine according to the flow chart of FIG. 2 is executed on a time interrupt basis once every 20 ms.)

Figure 8:
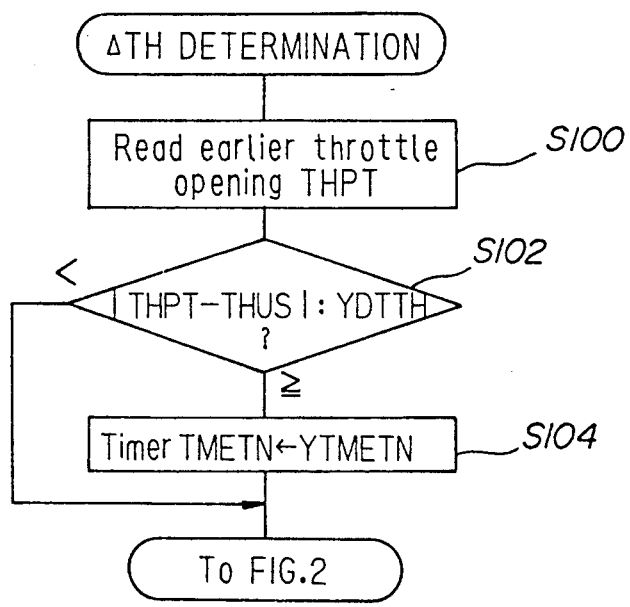
FIG. 8 is a subroutine of FIG. 2 flow chart showing how to determine the change of throttle opening.

In the routine according to the flow chart of FIG. 8, the throttle opening THPT detected a prescribed time earlier is first read, whereafter control passes to step S102 in which the absolute value of the difference between the throttle opening THPT and the throttle opening THUS detected in the current cycle is calculated and compared with a prescribed throttle opening YDTTH (e.g. $0.5/8 \times WOT$ [°]). If the difference is larger than the prescribed value, i.e. if the change in throttle opening is found to be large, control passes to step S104 in which a prescribed value YTMETN is set in a rapid throttle change timer (a down counter) TMETN and the passage of time is clocked. If the difference is found to be smaller than the prescribed value in step S102, the subroutine is immediately terminated.

Returning to the flow chart of FIG. 2, the predicted acceleration (designated GGH) is calculated in the following step S12.

Figure 9:
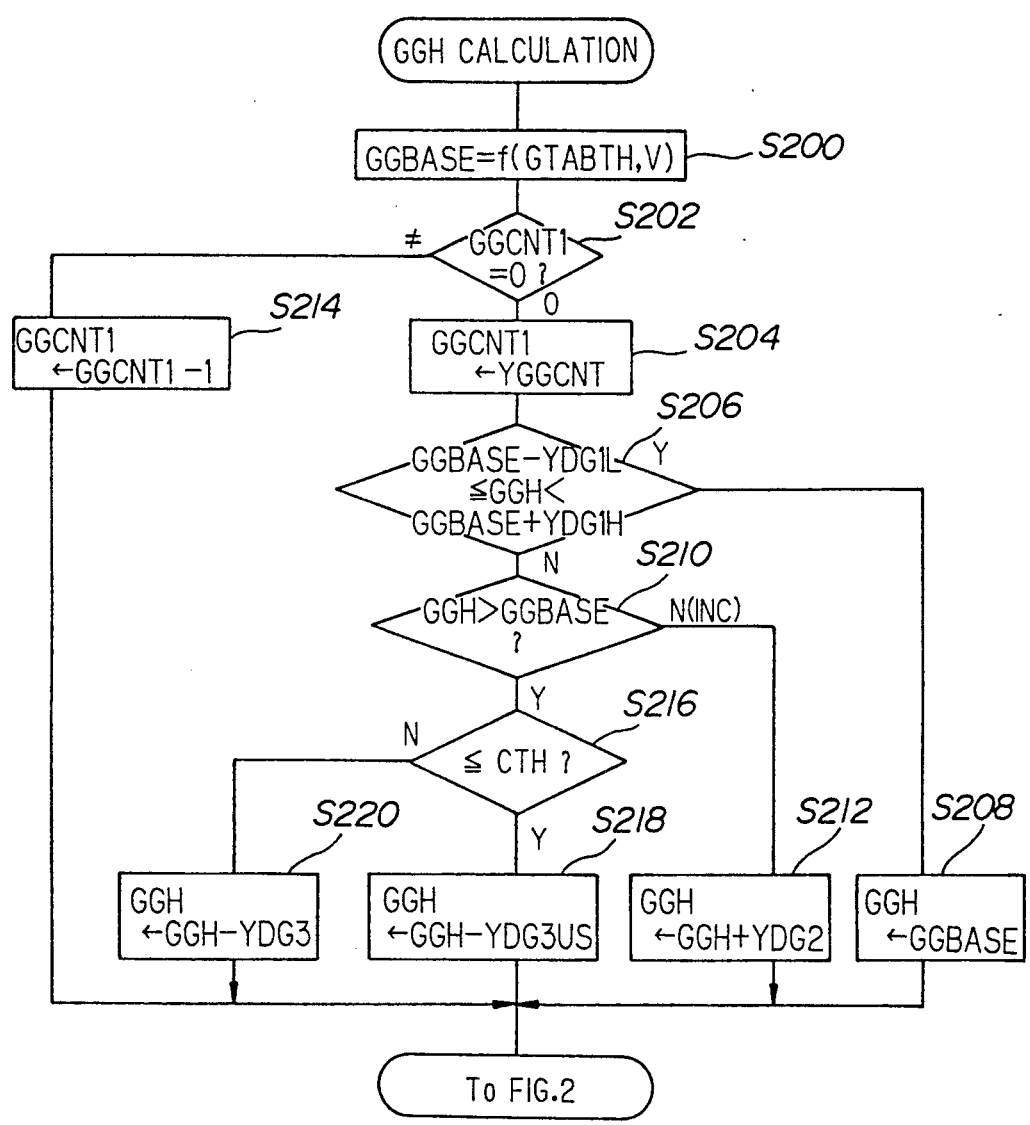
FIG. 9 is a subroutine of FIG. 2 flow chart for calculating the predicted acceleration GGH.

A subroutine for carrying out this calculation is shown in FIG. 9. In the first step S200 of this subroutine, reference is made to the look-up table having the characteristics already shown in FIG. 4 and, using the throttle opening (the throttle opening used for table value retrieval being referred to as "GTABTH") and the current vehicle speed V as address data, a table-retrieved value GGBASE of the predicted acceleration is obtained. As explained earlier, this value represents the vehicle acceleration predicted to occur when the vehicle is running in third gear on a level road with such a throttle opening and at such a vehicle speed. It is expressed in m/s$^2$. The values appearing in FIG. 4 are only examples selected for easy understanding.

Control then passes to S202 in which a check is first made as to whether or not the value of a down counter GGCNT1 (to be explained later) is zero, and if it is, the counter is set to a prescribed value YGGCNT and started in step S204. This counter is for setting a smoothing interval during which the predicted acceleration is gradually increased (or decreased) when the change between the predicted acceleration values retrieved in the preceding and current cycles is large. More specifically, advancing to step S206, the value obtained by adding (or subtracting) a small value YDG1H (or YDG1L) to the value of GGBASE retrieved in the current cycle is compared with the value of GGH in the preceding cycle and a decision is made as to whether or not the change between the preceding and current cycles is within a prescribed range. If the change is found to be within the prescribed range in S206, since this means that the amount of change is small, control passes to S208 in which the table-retrieved value (the value in the current cycle) GGBASE is used without modification as the predicted acceleration GGH.

Figure 10:
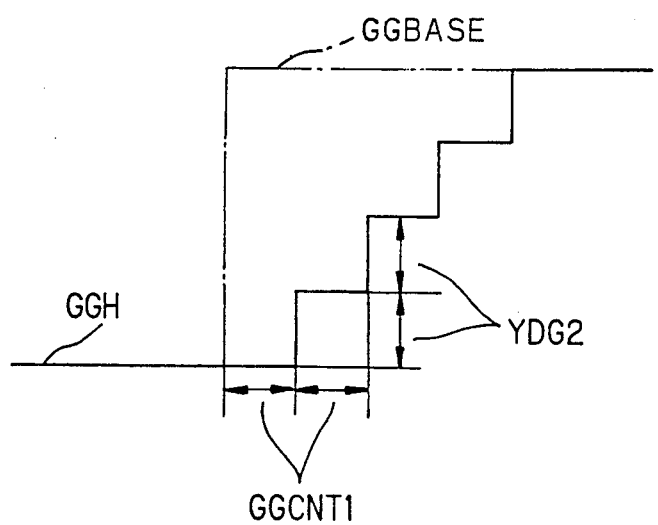
FIG. 10 is an explanatory view showing smoothing of the predicted acceleration calculated in the FIG. 9 flow chart when the change of the predicted acceleration is relatively large in the increase direction.

If step S206 finds that the change exceeds the prescribed range, control passes to step S210 in which the predicted acceleration GGH in the preceding cycle is compared with the table-retrieved value GGBASE in the current cycle, and if the change is found to be in the increase direction, control passes to step S212 where the value obtained by adding a prescribed unit amount YDG2 to the predicted acceleration GGH in the preceding cycle is used as the predicted acceleration GGH of the current cycle and the subroutine is terminated. Thereafter the counter value is decremented in step S214 in each subsequent execution of the subroutine and when it is found in step S202 that the counter value has reached zero, the counter is restarted in step S204 and control passes through step S206, step S210 to step S212, where another adjustment in the increase direction is conducted by adding the prescribed unit amount YDG2. In other words, as shown by the one-dot chain line in FIG. 10, when the change from the value in the preceding cycle is large, the steps gradually increase the value by incrementing it by a prescribed amount (YDG2) once every prescribed period of time (GGCNT1), until step S206 finds the change enters the prescribed range. This makes it possible to avoid abrupt changes in the predicted acceleration and thus to prevent the control hunting which would otherwise occur when the accelerator pedal is suddenly depressed.

Figure 11:
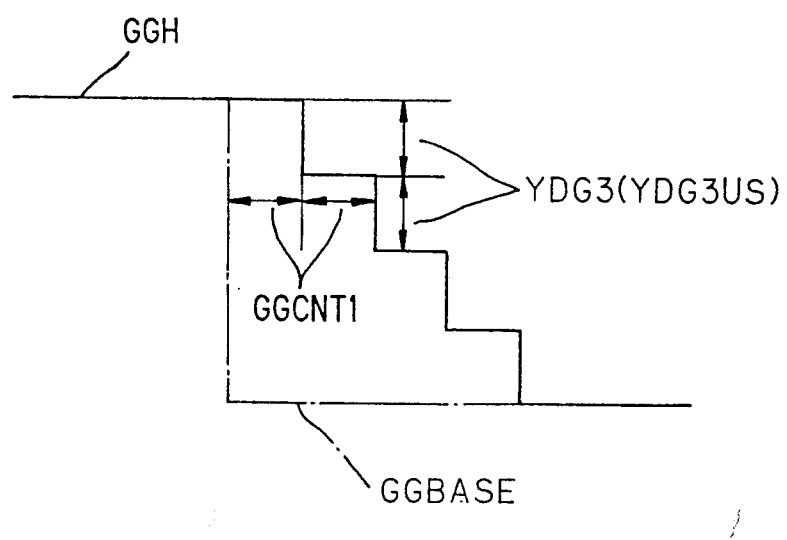
FIG. 11 is an explanatory view similar to FIG. 10, but shows smoothing of the predicted acceleration when the change of the predicted acceleration is relatively large in the decrease direction.

Similar circumstances also arise when it is found in step S210 that the predicted acceleration retrieved in the current cycle has decreased from the value in the preceding cycle. In this case, control passes to step S216 in which it is determined whether or not the throttle opening is at or below an opening CTH in the vicinity of fullclosed (the specific value of CTH being $(0.5/8) \times WOT$ [°]) and, depending on the result of the determination, the predicted acceleration GGH is gradually reduced so as to adjust it to the table-retrieved value in the current cycle by changing it either by a unit reduction amount YDG3US in step S218 or by a unit reduction amount YDG3 in step S220. The reason for using two different unit reduction amounts here is that the torque changes more quickly in response to changes in throttle opening when the throttle opening is at or below the vicinity of full-closed than it does in other cases. The relationship YDG3<YDG3US is therefore established. This stepwise adjustment in the reduction direction is shown in FIG. 11.

Returning to the flow chart of FIG. 2, the actual acceleration HDELV is calculated in step S14. The subroutine for this calculation is shown by the flow chart in FIG. 12. As was mentioned earlier, the predicted acceleration is the value for the case of driving in third gear and this makes it necessary to adjust the actual acceleration to a value corresponding to that in third gear. In the flow chart of FIG. 12, therefore, it is determined in steps S300 and S302 whether or not the current gear is second gear or below, third gear, or fourth gear and, depending on the result, a correction coefficient is determined in step S304, step S306 or step S308. Three separate correction coefficient look-up tables are prepared in advance, one for the first and second gears, one for third gear and one for fourth gear, each preestablishing ratio values addressed in accordance with the throttle opening and the vehicle speed, similarly to the case of the predicted acceleration look-up table shown in FIG. 4. Retrieval of the ratio values is conducted using the throttle opening GTABTH that was used for predicted acceleration retrieval and the vehicle speed V as address data (the table-retrieved correction coefficient is referred to as "GGFBASE"). No distinction is made between first gear and second gear in view of the fact that the fundamental purpose of the control is to improve gearshift performance during hill climbing and hill descent and, specifically, is achieved by switching from the map for level-road driving to one for hill climbing or hill descent. Control according to a hill-climbing map causes a downshifting for increasing driving power, while that according to a hill-descent map cause a downshifting for increasing the braking effect of the engine. Since first gear is the lowest and no shifting down from this gear is possible, the same data is used for first gear as for second, because this simplifies the control. As regards the ratio table for third gear, moreover, since the predicted acceleration with which the actual acceleration adjusted using this ratio is compared is that for driving in third gear, the data for the ratio is set to 1.0.

Next, step S310 checks whether or not the value of a second down counter GGCNT2 is zero, and if it is, control passes to step S312 in which the counter is set to the prescribed value YGGCNT and started, to step S314 in which the retrieved correction coefficient is compared with that in the preceding cycle to determine whether the difference with respect thereto falls outside a prescribed range and if it does, a smoothing operation similar to that conducted earlier in respect of the predicted acceleration is carried out. More specifically, in step S314 the value in the current cycle $\pm YDF1L,H$ is compared with that in the preceding cycle, and if it is within this range, control passes to step S316 in which the table-retrieved correction coefficient GGFBASE is used without modification as the correction coefficient GGF, and then to step S318 where it is multiplied by the first-order difference delta V in the detected vehicle speed value, i.e. by the change in vehicle speed per prescribed time period, to obtain the actual acceleration HDELV. When it is found in step S314 that the difference between the values in the current and preceding cycles is outside the aforesaid range, control passes to step S320 in which the value of GGF in the preceding cycle and the value of GGFBASE in the current cycle are compared to determine whether the change is in the increase direction, and if it is, passes to step S322 in which a unit increase amount YDF2 is added to the value of GGF in the preceding cycle and the result used as the correction coefficient in the current cycle, whereas if the change is in the decrease direction, control passes to step S324 in which a unit reduction amount YDF3 is subtracted from the value of GGF in the preceding cycle and the result used as the correction coefficient in the current cycle. In each subsequent execution of the subroutine, the counter value is decremented in step S326 until it is found in step S310 that the counter value has reached zero, at which time the increase (reduction) adjustment is repeated until it is found in step S314 that the adjusted value has come into the vicinity of that in the preceding cycle. As was explained regarding the predicted acceleration in connection with the flow chart of FIG. 9, the reason for using the aforesaid arrangement is to prevent abrupt changes in the control value. While it was stated that the actual acceleration is calculated from the difference in the vehicle speed, it is alternatively possible to calculate it from the differential value. In either case, it is expressed in the same units as the predicted acceleration ($m/s^2$).

Figure 12:
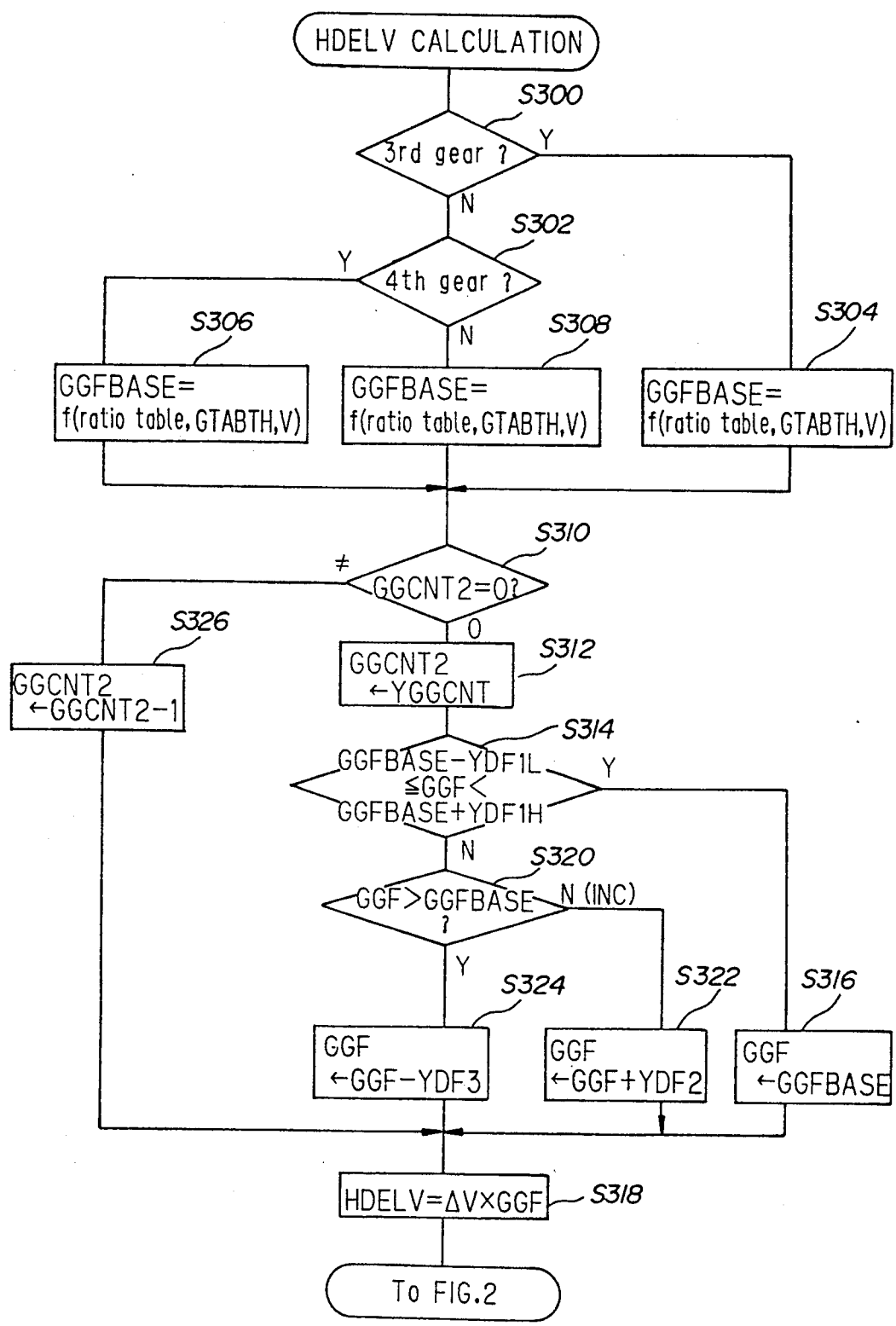
FIG. 12 is a subroutine of FIG. 2 flow chart for calculating an actual acceleration HDELV of a vehicle.

Upon completion of the subroutine according to the flow chart of FIG. 12, control passes to step S16 of the flow chart of FIG. 2, in which the difference PNO or PKU between the predicted acceleration GGH and the actual acceleration HDELV is calculated. The subroutine for this calculation is shown by the flow chart in FIG. 13. PKU is the hill-descent direction difference obtained by subtracting the predicted acceleration GGH from the actual acceleration HDELV, while PNO is the hill-climbing direction difference obtained by subtracting the actual acceleration HDELV from the predicted acceleration GGH.

Figure 13:
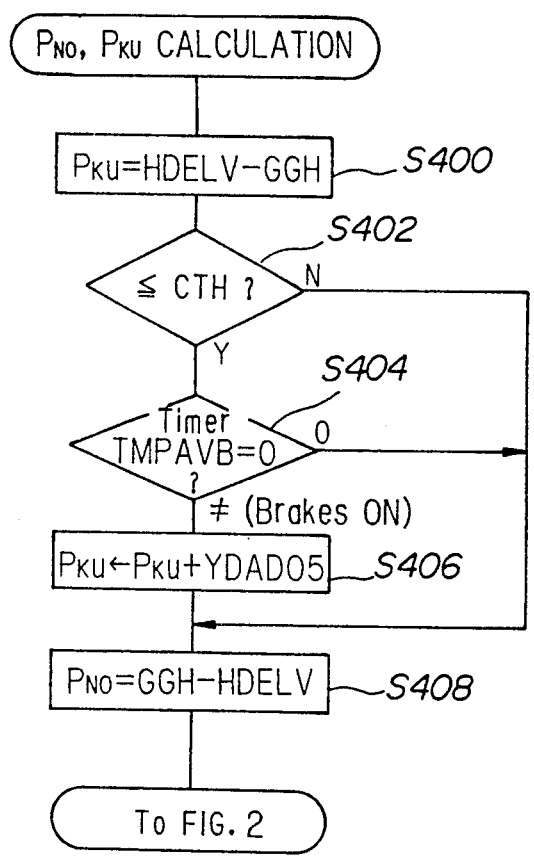
FIG. 13 is a subroutine of FIG. 2 flow chart for calculating a difference PNO or PKU between the predicted acceleration and the actual acceleration.

The subroutine according to the flow chart of FIG. 13 starts with step S400 in which the difference PKU is obtained by the aforesaid method of calculation. The reason for reversing the subtraction order in calculating the differences is that during hill descent the actual acceleration becomes larger than the predicted acceleration (for level-road driving), while the opposite is the case during hill climbing. Moreover, the calculations of the differences for hill climbing and hill descent are made independently of whether or not the vehicle is actually traveling up or down hill. That is, the result obtained by subtracting the predicted acceleration from the actual acceleration is simply taken as the difference for hill descent and the reverse as the difference for hill climbing. This not only suffices but is advantageous. As will be explained in more detail later, the average value of the respective differences is used for map selection. If the vehicle is actually traveling downhill, only the difference PKU in the hill-descent direction will be positive, whereas if the vehicle is traveling uphill, the difference in the hill-climbing direction will be zero or less. By using only positive values for map selection it becomes possible to effectively determine the optimum gear ratio in response to changes in road slope without need for installing an inclination sensor.

Control then passes to step S402 which determines whether or not the throttle opening is at or below the opening CTH in the vicinity of full-closed, and if it is, next passes to step S404 which determines whether or not the value of a timer TMPAVB (down timer) has reached zero. This timer will be explained further in connection with FIG. 2. Here it suffices to say that it is set at the time the brakes are applied and starts when the brakes are released. Therefore, the determination here is for checking whether or not the brakes are being applied, more precisely whether or not a prescribed time has passed since the brake pedal was released after being once depressed. This is so that it will be determined that the brakes are being applied not only during depression of the brake pedal but also for a prescribed period (timer value) after its release, which is desirable because the braking system has a response delay and it takes a prescribed time for the braking force to reach zero after the depressed brake pedal is released. If step S404 finds that the brake timer value is not zero (braking in progress), control passes to step S406 in which difference PKU is increased by adding a prescribed amount YDAD05 thereto. This is for compensating for the decrease in the actual acceleration caused by the braking force. Control then passes to step S408 in which the difference PNO is calculated by subtracting the actual acceleration HDELV from the predicted acceleration GGH.

Control next passes to step S18 of the flow chart of FIG. 2, where it is determined whether or not the brake switch is on, and if it is, passes to step S20 in which the brake timer TMPAVB is set to a prescribed value YTMPAVB and started. (Since after the start of braking is detected resetting of this timer does not first occur at the time that the "brakes on" determination is canceled following release of the brake pedal but occurs during each succeeding loop of the program, the down count continues after release of the brake pedal. As a result, the timer value indicates the time lapsed after braking is discontinued.) Control next passes to step S22 in which it is determined from the range selector switch signal whether or not the selected range is D4, D3,2, and if it is, passes to step S24 where it is determined whether or not switching between these three ranges is in progress. If it is not, control passes to step S26 in which a timer TMPAHN2 is set to be a prescribed value YTMPAHN2 and is started. (Since step S26 is skipped when the determination in step S24 is affirmative, the timer value indicates the range switching time period, similar to what was explained concerning step S20.) Next, in step S28, a flag BROK2 is checked to determined whether or not the brake signal is normal. Whether the brake signal is normal or not is checked through another subroutine (not shown) which determines the brake signal to be normal if each of a brake-on signal and a brake-off signal continue for a prescribed period of time after the ignition switch is turned on, and otherwise determines it to be abnormal. The result is indicated by the flag.

Figure 14:
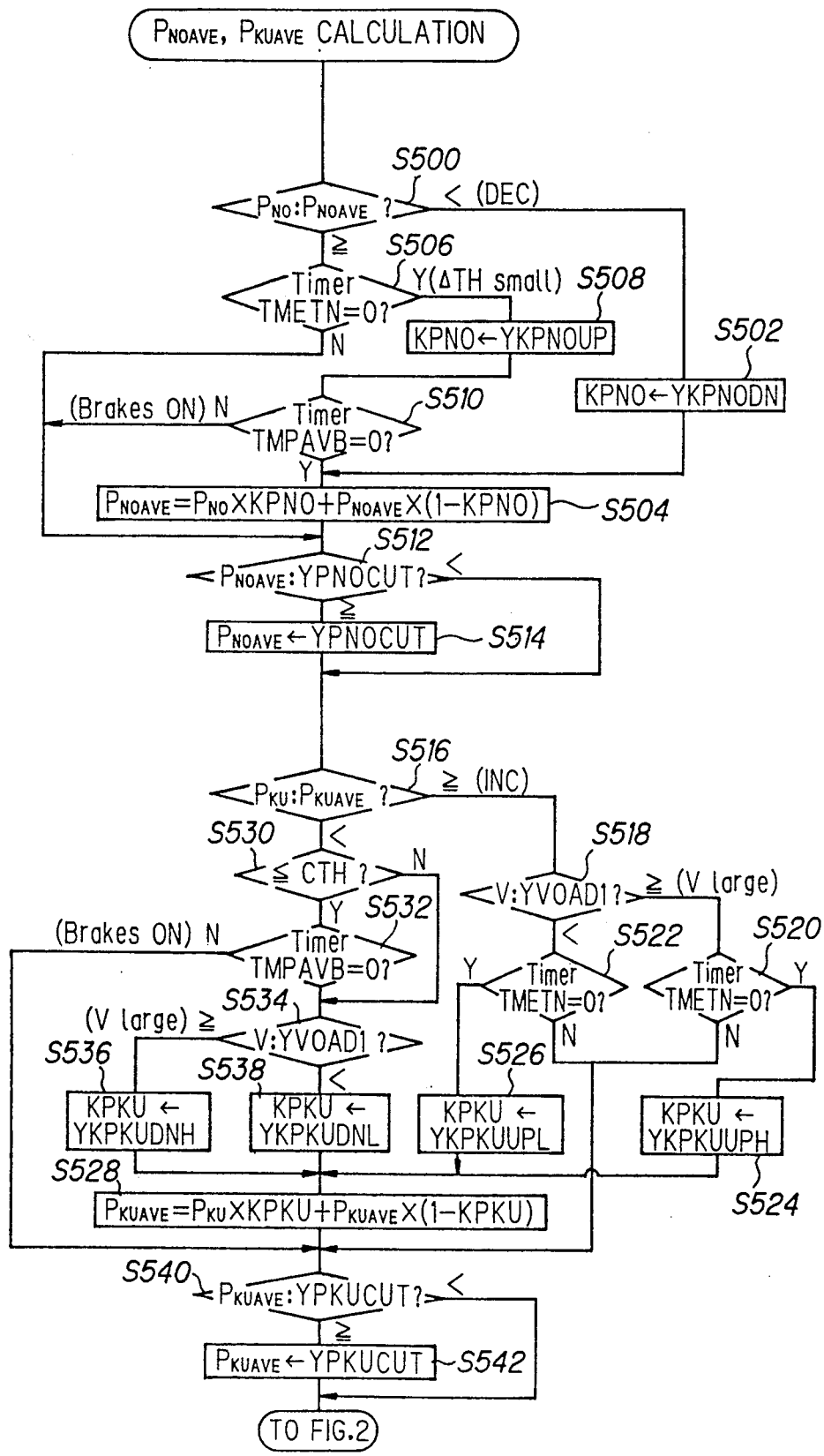
FIG. 14 is a subroutine of FIG. 2 flow chart for calculating a weighted average PNOAVE or PKUAVE of the differences.

When step S28 finds that the brake signal is normal, another determination is made in step S30 as to whether or not range switching is in progress and if the result is negative, control passes to step S32 in which it is determined whether or not the value of a timer TMPAHN has reached zero. This timer is started at the time that it is found by another subroutine (not shown) that the excitation pattern of the solenoid valves 54, 56 has switched, and indicates that gear shifting is in progress. Since the fact that the timer count value has reached zero therefore means that gear shifting is not in progress, control passes to step S34 in which it is determined whether or not the current gear is first gear, and if it is not, passes to step S36 in which the average values (more specifically, the weighted average values) PNOAVE, PKUAVE of the differences PNO, PKU are calculated. The flow chart of a subroutine for carrying out this calculation is shown in FIG. 14.

The subroutine starts from step S500 in which the hill-climbing direction difference PNO calculated in the current cycle is compared with the running average value (weighting coefficient) PNOAVE up to that time so as to determine whether the change relative to the value up to the preceding cycle is in the increase or decrease direction. If it is found to be in the decrease direction, control passes to step S502 in which a smoothing coefficient KPNO is set to YKPNODN and then to step S504 in which the weighted average value is calculated using the equation shown. On the other hand, if it is found to be in the increase direction, control passes to step S506 in which it is determined whether or not the count value of the rapid throttle change timer TMETN referred to earlier in connection with FIG. 8 has reached zero, i.e. whether or not the throttle opening is changing rapidly. If it is not, control passes to step S508 in which the smoothing coefficient is set to YKPNOUP, to step S510 in which it is confirmed that braking is not in progress, and then to step S504 in which the weighted average value is calculated. Step S504 is skipped when step S506 finds that the throttle opening is changing rapidly. In this case, therefore, the average value PNOAVEn-1 calculated in the preceding cycle is used for deciding (holding) the map. As a result, it is possible to avoid making an error in the control value (map selection) during times when the throttle opening changes abruptly. The case where it is found in step S510 that the brakes are on is handled similarly. Since the apparent engine output torque is decreased by an amount corresponding to the braking force, which increases in proportion to the force with which the driver depresses the brake pedal, the engine does not produce an output torque corresponding to the table-retrieved throttle opening. Therefore, step S504 is skipped and the average value calculated in the preceding cycle is used.

Figure 15:
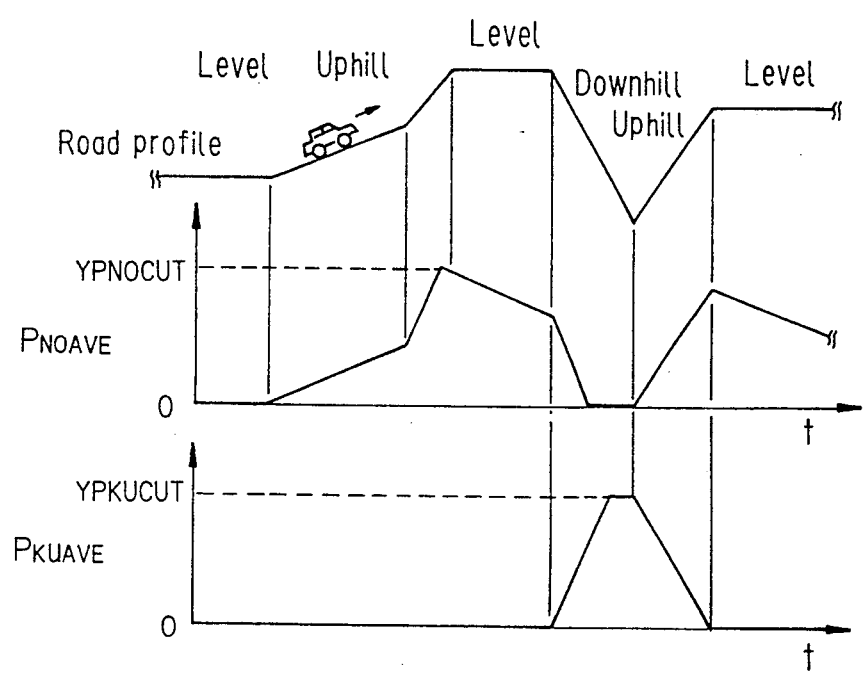
FIG. 15 is an explanatory view showing upper limit values used in FIG. 14 flow chart.

Control then passes to step S512 in which the calculated value is compared with an upper limit value YPNOCUT and if it is found to be larger, the upper limit value is updated in step S514. In other words, when the vehicle finishes climbing the hill and reaches level ground again, the map has to be promptly changed to that for level-road driving, as shown in FIG. 15. This is the reason for establishing the upper limit value.

Next, the hill-descent direction difference value is calculated starting from step S516 in which the value PKU calculated in the current cycle is compared with the average value PKUAVE up to the preceding cycle. When it is found to be changing in the increase direction, since this means that the vehicle continues to travel downhill, control passes to step S518 in which the vehicle speed V is compared with a prescribed vehicle speed YVOAD1, to step S520 or step S522 in which it is confirmed that the throttle opening is not changing rapidly, and then, depending on the result of the comparison, to step S524 or step S526 in which a smoothing coefficient (weighting coefficient) KPKU is selected, and thereafter to step S528 in which the weighted average value PKUAVE is calculated. The reason for changing the coefficient according to the vehicle speed is to provide an early opportunity for downshifting in view of the vehicle speed during hill descent, which is desirable because the running resistance is not so large during hill descent. Therefore, the relationship YKPKUUPH>YKPKUUPL is established between the coefficients so that the coefficient becomes larger with increasing vehicle speed, whereby the value in the current cycle is strongly reflected in the average value. For the same reason as was explained with respect to PNO, step S528 is skipped and the average value in the preceding cycle used when steps S520 and S5202 determine that the throttle opening is changing rapidly.

When it is determined in step S516 that value in the current cycle has decreased from the running average value up to the preceding cycle, this is taken to mean that the downhill slope is coming to an end and, therefore, control passes to step S530 in which it is confirmed that the throttle is at or below the vicinity of full-closed and to step S532 in which it is confirmed that braking is not in progress, thereafter to step S534, similarly to what was explained above, one of the smoothing coefficients is selected in response to the vehicle speed and the average value calculated (steps S536, S538, S528). Here again, as in the case a change in the increase direction, the coefficient is set to be larger toward the high vehicle speed side. Next, from step S540 onward, it is determined whether or not the calculated value is greater than the upper limit value, and if it is, is limited to the upper value in step S542. As shown in FIG. 15, this is for compensating for detection delay at the time of returning to level ground, similarly to the case of hill climbing explained earlier. If step S532 finds that braking is in progress, it becomes difficult to obtain an accurate value for the same reason as explained with respect to step S510 and, therefore, control is passed directly to steps S540 and S542 for using the average value up to the preceding cycle.

Returning to FIG. 2, when the conditions of steps S18 to S34 are satisfied, control passes to step S36 where the average values of the differences are calculated in the manner just explained. An explanation will now be given regarding what happens when these conditions are not met. First, if the result is negative in step S22, i.e. if it is found that the selected range is P, R, N or 1, since this means that there is no need to conduct hill-climbing or hill-descent control, control passes to step S38 in which the timer started in step S26 for determining the range switching time period is reset because the clocking of this period has become meaningless, and then to step S42 in which the average difference values are set to zero. Therefore, as will be explained later, the map for level-road driving is selected. The same also applies in the case where step S28 determines that the brake signal is abnormal. Further, in the case where step S30 determines that range switching is in progress and step S40 thereafter determines that the timer value has reached zero, since this means that the time used for range switching is so long as to indicate an abnormality such as a broken wire or the like, control again skips to step S42. For ensuring continuity of the control up to the time that step S40 determines that the timer value has reached zero, control passes to step S44 in which, similarly to what was explained earlier in connection with step S506 of the flow chart of FIG. 14 and the like, the average difference value in the preceding cycle is used. The same also applies in the case where step S32 determines that gear shifting is in progress. When gear shifting is in progress, it is of course impossible to determine the current gear and, moreover, the acceleration is unstable, so control is passed to step S44 and the average value in the preceding cycle is used. The case where step S34 determines that the current gear is first gear is handled in the same way because, it not being possible to shift down from first gear, this enables the processing to be simplified.

Figure 16:
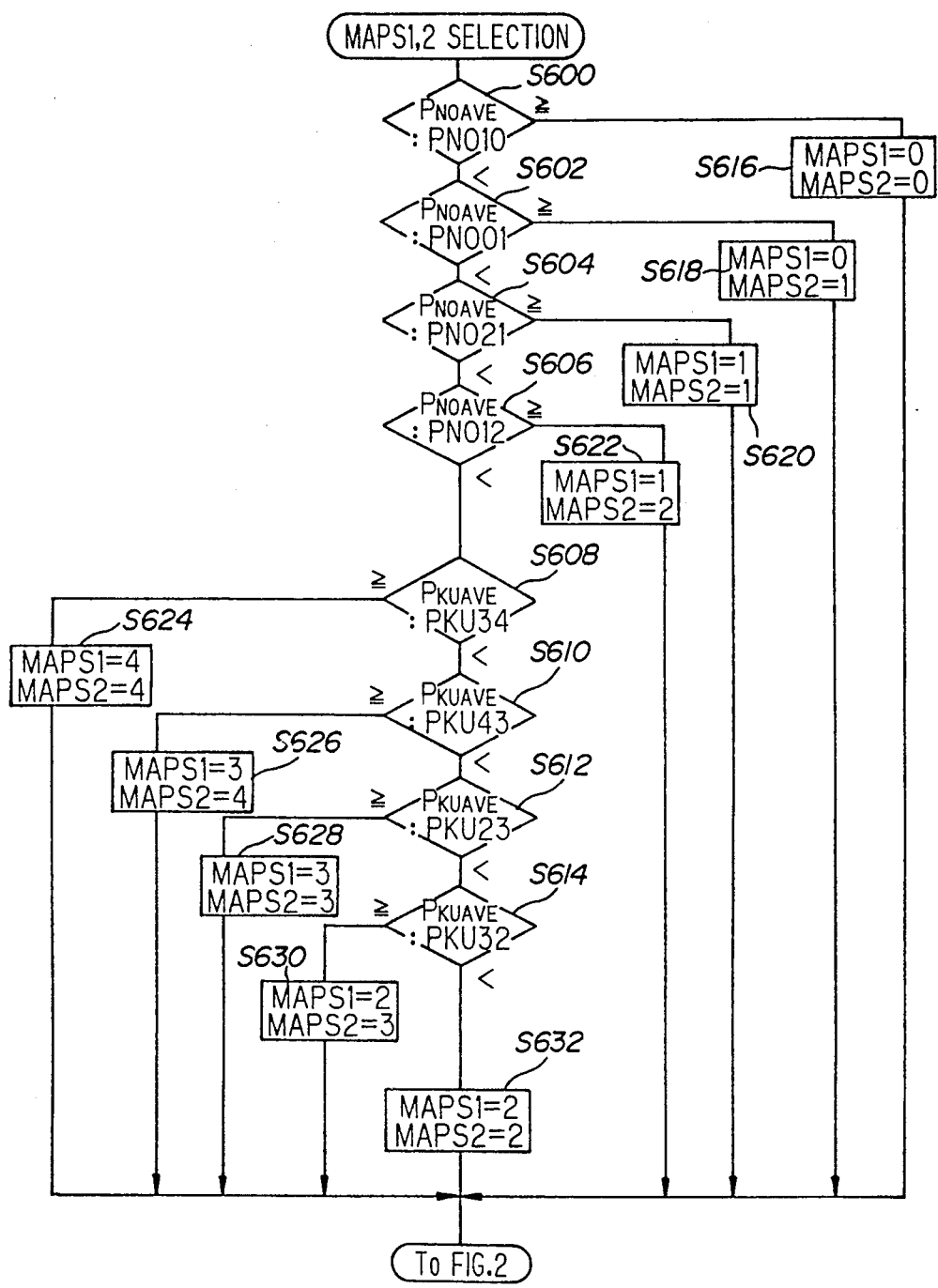
FIG. 16 is a subroutine of FIG. 2 flow chart for conducting selection of possible maximum and minimum maps MAPS1,2 based on the weighted average.
Figure 17:
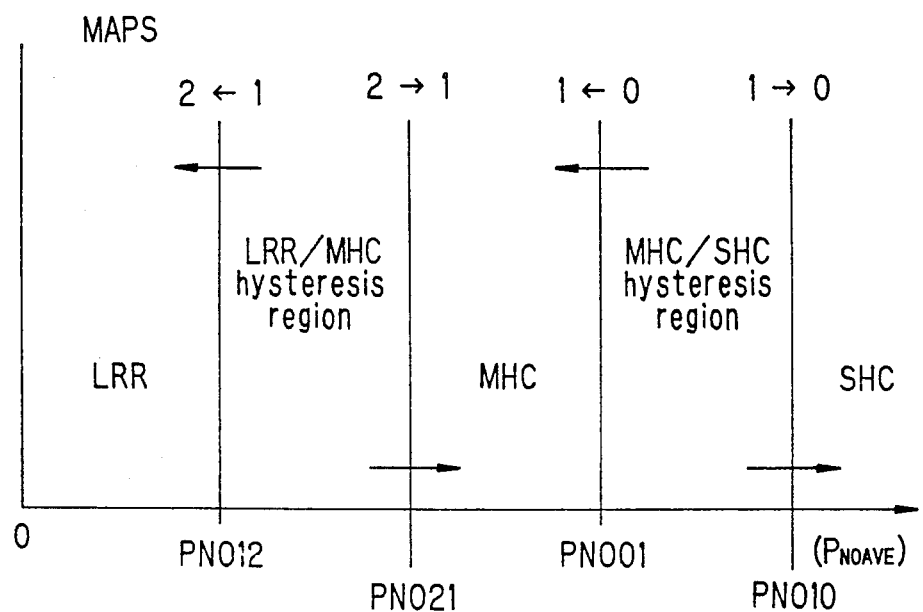
FIG. 17 is an explanatory view showing reference values for map selection used in FIG. 16 flow chart.
Figure 17:
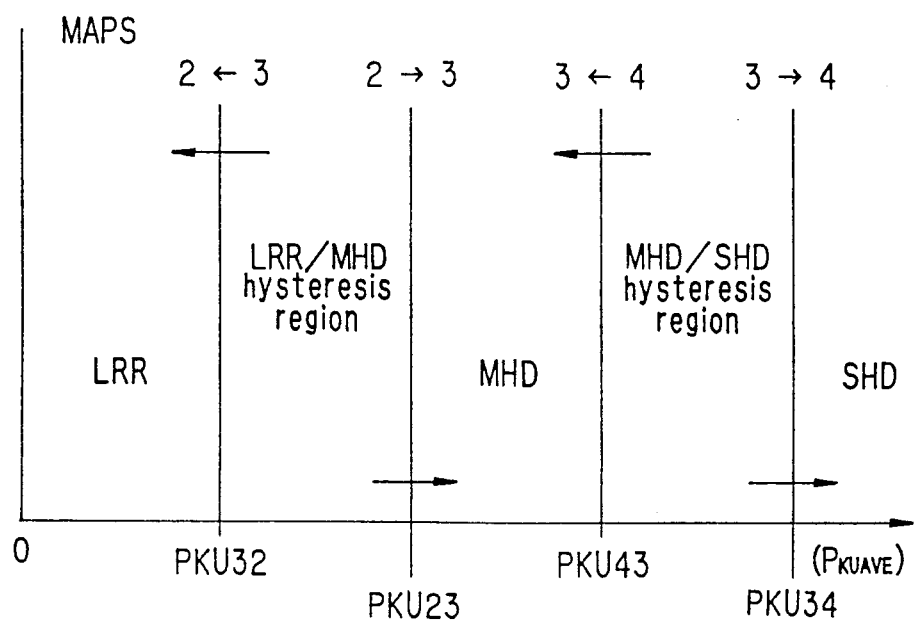

In the flow chart of FIG. 2, control next passes to step S46 in which selection of possible maximum and minimum maps MAPS1,2 is conducted. Five types of shift maps corresponding to five degrees of slope are assigned the numbers 0, 1, 2, 3 and 4 and the maximum value and minimum value (map number) that can be adopted in view of the average difference value at that time are set as MAPS 1, 2. FIG. 16 shows the flow chart of a subroutine for carrying out this selection. In steps S600–S606 the hill-climbing direction average value PNOAVE is compared with each of map reference values PNOmn and, following this, in steps S608 S614 the hill-descent direction average value PKUAVE is compared with each of map reference values PKUmn. As a result, one of steps S616–S632 is selected and the minimum value that can be adopted (MAPS1) and the maximum value that can be adopted (MAPS2) are decided. FIG. 17 shows map reference values established in correspondence with average difference values.

As stated above, in the control according to this embodiment of the invention, five types of maps are prepared and assigned numbers as follows:
0: steep hill climbing
1: moderate hill climbing
2: level-road running
3: moderate hill descent
4: steep hill descent As shown in FIG. 17, hysteresis regions are established between adjacent maps and when the average difference value falls in one of these regions the map on either side can be adopted. In the control, the maximum value and minimum value (as regards map number) is first decided. The result of the selection by the flow chart of FIG. 16 can be summarized as shown in FIG. 18. It will be understood from FIG. 17 why, as mentioned earlier, the setting of the average difference value to zero in step S42 of the flow chart of FIG. 2 results in selection of the map for level-road running.

Thus, returning to the flow chart of FIG. 2, in the succeeding step S48 one map is decided on between the two types of selected maps.

Figure 19:
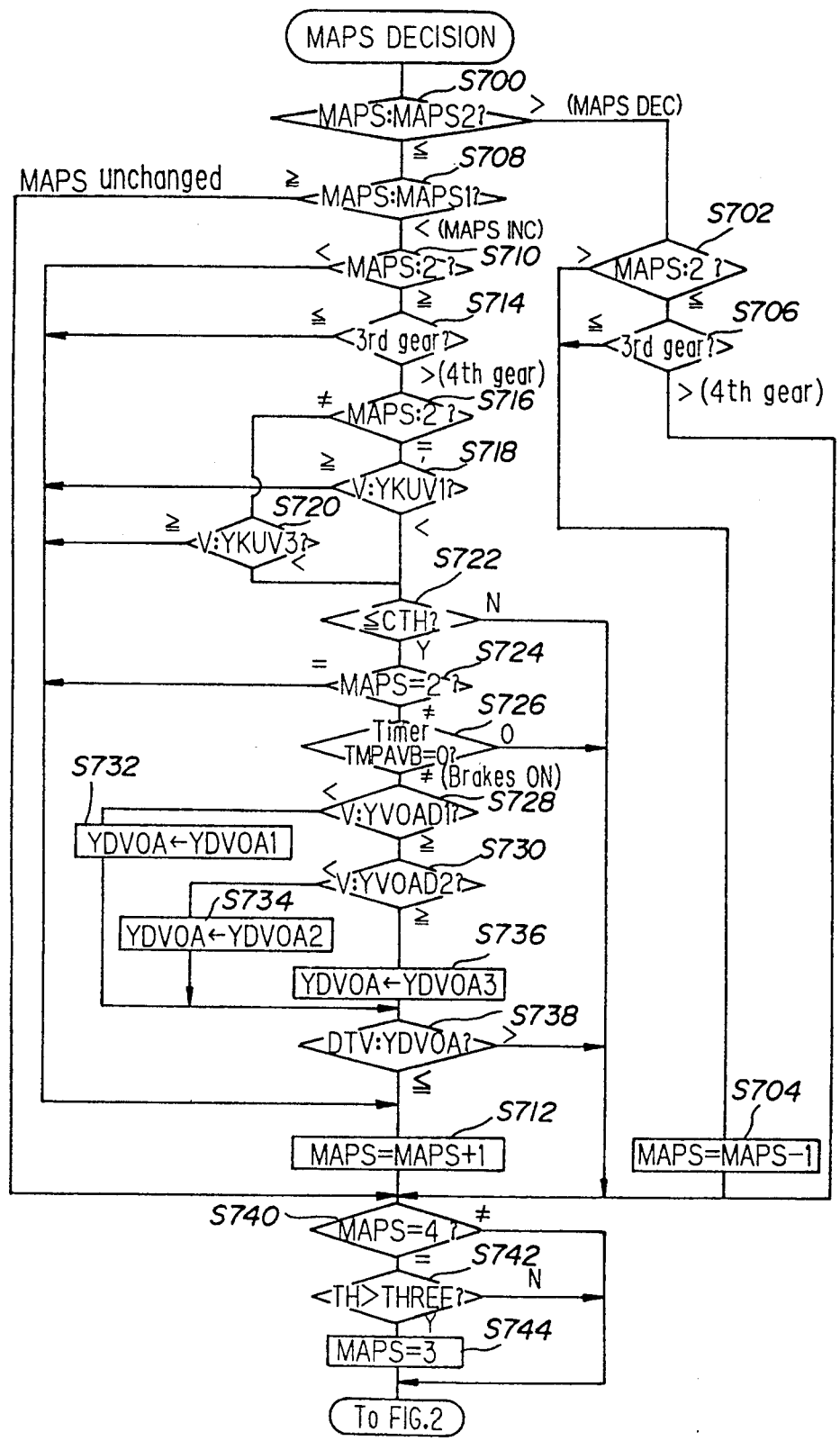
FIG. 19 is a subroutine of FIG. 2 flow chart for deciding one map MAPS on between the selected maps.

The flow chart of a subroutine for carrying out this decision is shown in FIG. 19. First, in step S700, the currently selected map (referred to as "MAPS") and MAPS2 (the maximum map) are compared. More specifically, since, logically, it suffices to decide the map to be selected so that maximum map≧selected map≧minimum map, it is first determined whether or not the current map exceeds the maximum map, and if it does, the selected map is changed to the maximum map or a lower one.

Therefore, when step S700 finds that the current map exceeds the maximum map, the number of the current map has to be greater than 0, meaning that it is one of map numbers 1, 2, 3 and 4, and control thus passes to step S702 which determines whether or not its number is 2 (level-road running map). If it is higher or greater than 2, the possibilities become map numbers 3 and 4, and since these are maps for hill descent, the map number obtained by subtracting 1 from the current map number is decided on in step S704. For example, if the map for steep hill descent is currently being used, a switch is made to the map for moderate hill descent. When step S702 finds that the current map is the one for level-road running or a lower one, the possibilities become 2 and 1, and a switch is made from the map for level-road running to the map for moderate hill climbing or from the map from moderate hill climbing to the map for steep hill climbing. As was indicated earlier in connection with FIGS. 5 and 6, in the maps used in the present control the third-gear range is broader in the map for moderate hill climbing than in the map for level-road running and is broader in the map for steep hill climbing than in the map for moderate hill climbing. The same also applies on the hill-descent side, namely the breadth of the third-gear range increases in order from the map for level-road running to the map for moderate hill descent to the map for steep hill descent. This relationship is established for increasing driving power during hill climbing and increasing the engine braking effect during hill descent. However, it leads to the possibility that when the vehicle is being driven in fourth gear a switch in maps will cause an immediate shift-down to third gear, which is not likely to be what the driver expects and is thus undesirable. For avoiding this, a determination is made in step S706 as to whether or not the current gear is third gear, and only in the case where it is found to be third or a lower gear, is a switch made from the map for level-road running to the map for moderate hill climbing or from the map for moderate hill climbing to the map for steep hill climbing. Thus map switching is suspended during driving in fourth gear.

When step S700 finds that the current map is the maximum map or a lower one, since this means that the upper limit condition is met, a determination is next made regarding the lower limit condition. Specifically, step S708 determines whether or not the current map (number) is MAPS1 (minimum map (number)), and if it is found to be the minimum map or a higher one, this means that the aforesaid logical relationship is met and the map is not changed.

Figure 20:
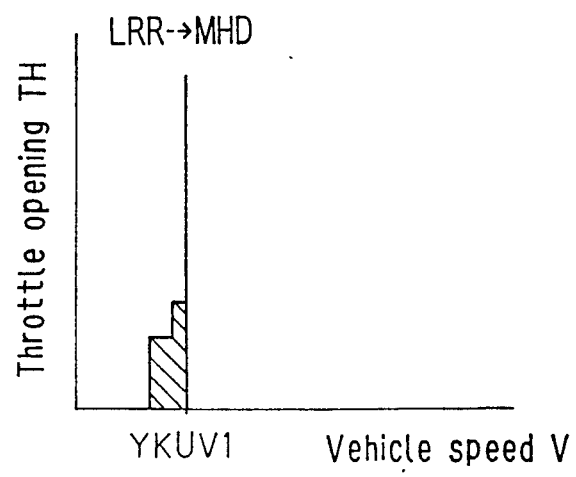
FIG. 20 is an explanatory view showing a boundary vehicle speed between the map for level-road running and the map for moderate hill descent.

If step S708 finds that the current map (number) is lower than the minimum map, it become necessary to switch to a value not lower than that of the minimum map. Control therefore passes to step S710 in which the current map is compared with the map for level-road running. If the current map is found to be lower than the map for level-road running, this means that the map that should be selected is either 1 or 2, and therefore, control passes to step S712 in which 1 is added to the number of the current map. Thus if the map for moderate hill climbing is currently in use, it is switched to the map for level-road running, and if the map for steep hill climbing is currently in use, it is switched to the map for moderate hill climbing. If step S710 finds that the current map is the map for level-road running or a higher or greater one, since this means that the current map number is 2 or 3 (since step S708 found the current map number to be smaller than that of the minimum map, the number of the current map cannot be 4 even if the minimum map is assumed to have the maximum value of 4). L Since increasing from 2 or 3 leads to a problem regarding the broadening of the third-gear range, control passes to step S714 in which a determination is made as to whether or not the current gear is third or lower, and if it is, since this means that no unexpected downshifting will occur, control passes to step S712 in which map switching is carried out immediately. On the other hand, if the current gear is found to be fourth gear, control passes to step S716 in which the current map (number) is compared with the level-road running map (number) If step S716 determines that the current map (number) is the level-road running map (number), control passes to step S718 in which the vehicle speed is compared with a prescribed value YKUV1, and if it determines that the current map (number) is not the level-road running map (number), i.e if it determines that the current map (number) is the moderate hill climbing map (number), control passes to step S720 in which the vehicle speed is compared with another prescribed value YKUV3. If the vehicle speed is found to be equal to or greater than the prescribed value in either of steps S718 or S720, control skips to step S712 and map switching is carried out. This will be better understood from FIG. 20. As was explained earlier, the breadth of the third gear range is greater in the maps for hill climbing and descent than in the map for level-road running. As shown specifically in FIG. 20, the boundary vehicle speed for shifting from third gear to fourth gear when the map is changed from that for level-road running to that for moderate hill descent is set as vehicle speed YKUV1. Since there is therefore no possibility of a shift-down when the vehicle speed is equal to or higher than the boundary speed, control is passed to step S712 for switching maps. On the other hand, if the vehicle speed is found to be below the boundary level, the possibility of a downshifting exists and, therefore, a determination is carried out in the following steps as to whether or not one will. While FIG. 20 relates only to the case of switching from the level-road running map (#2) to the moderate hill descent map (#3), switching from the moderate hill descent map (#3) to the steep hill descent map (#4) is handled in a similar manner.

When it is found in step S718 or step S720 that the vehicle speed is below the boundary level, control passes to step S722 in which it is determined whether or not the throttle is at or below the vicinity of full-closed. If the result is negative, since this means that the accelerator pedal is being depressed and the accelerator pedal is being depressed at fourth gear, a shock could arise if gear is shifted down. This will be a special driving condition and at any rate this does not imply that the driver intends to shifted down to use engine braking, controls skips step S712 to avoid map changing.

Figure 21:
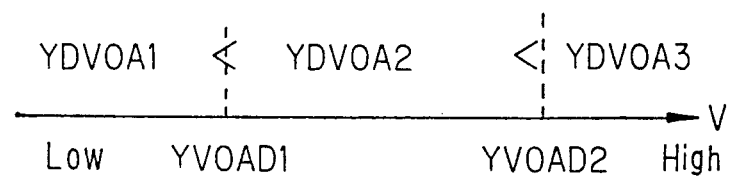
FIG. 21 is an explanatory view showing the characteristics of deceleration data used in FIG. 19 flow chart.

On the other hand, step S722 founds that the throttle is at or below the vicinity of full-closed, since this means that the accelerator pedal is not depressed and implies that the driver wants to reduce the vehicle speed, control passes to step S724 in which another check is made as to whether or not the current map is that for level-road running, and if it is, skips to step S712 in which the map is changed, and if it is not, since this means that the current map is that for moderate hill descent, passes to step S726 where a determination is made as to whether the brakes are being applied, so as to discern whether the driver actually wants to decelerate. If the brakes are not being applied, since this can be taken to mean that it is not the driver's intention to slow down, step S712 is skipped and the map is not changed. If it is found that the brakes are being applied, control passes through steps S728 and S730 for comparing the current vehicle speed V with prescribed values YVOAD1,2, whereby deceleration data YDVOA (explained later) is selected at steps S732, S734, S736, and then to step S738 in which the selected deceleration data YDVOA is compared with the actual deceleration DTV (deceleration of vehicle speed per unit time during braking) and if the actual deceleration is larger, it is determined that rapid deceleration is in progress and control passes to step S712 for changing the map. This is conducted notwithstanding that the driver has applied the brakes and wants to slow down and is for preventing map switching and thus avoiding an abrupt engine braking effect (owing to downshifting) which would otherwise occur at an intensity that increases in proportion to the vehicle speed at the time of the shift-down. Thus, the map is changed to enable downshifting only when it is determined from the result of the comparison that rapid deceleration is intended. FIG. 21 shows the relationship among the deceleration data.

Control next passes to step S740 which determines whether or not the selected map (number) is 4 (for steep hill descent), and if it is, to step 742 which determines whether or not the throttle opening TH is equal to or larger than a prescribed value THREF (the specific value of THREF being (2/8)×WOT [°]), and if it is, to step S744 in which rewriting of the map (number) to 3 (map for moderate hill descent) is forced. This is conducted because the circumstances show that the driver wants to accelerate, i.e. does not want to use the engine braking effect, notwithstanding that the vehicle is traveling down a steep hill.

Figure 22:
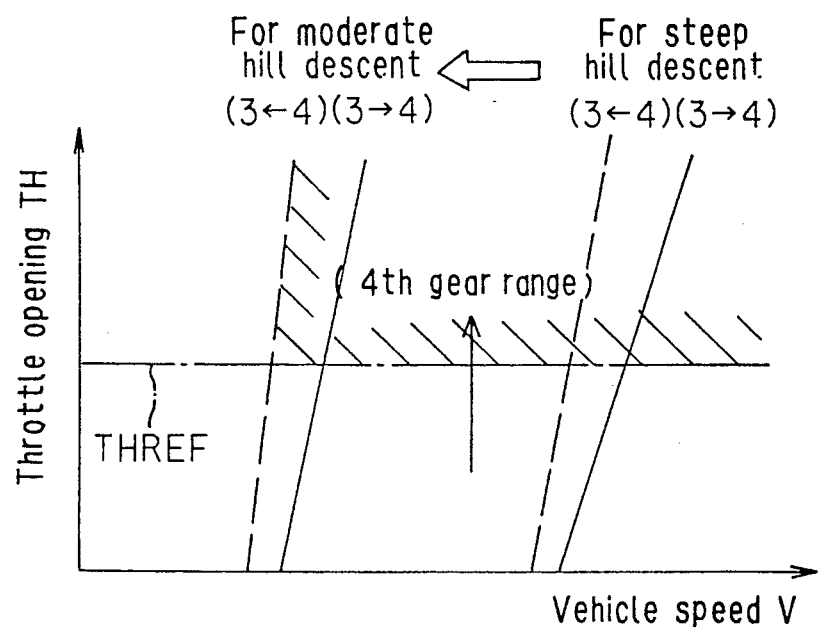
FIG. 22 is an explanatory view showing the characteristics of the third-gear range and the fourth gear range in the maps for moderate hill descent and for steep hill descent.

To be more specific, the third-gear range in the map is made further broader than the moderate hill descent map as shown in FIG. 22. If the steep hill descent map is selected, as a result, third gear is frequently used. As explained earlier, on the other hand, the necessity of engine braking is not high when running down a moderate hill and still less, a use of lower gear causes engine speed higher, which makes engine noisier. In view of the above, it is presumed that the driver does not want the engine braking if the throttle valve is opened greatly than or equal to the value THREF. Rather, he does not presumably expect an acceleration at such an instance. It is therefore arranged that the map is switched to map (number) 3 for moderate hill descent. As a result, the gear will possibly be shifted up to fourth as illustrated in the figure, a drive feeling will be improved during moderate hill descending. It should be noted that the characteristics depicted in the figure is simplified for ease of understanding.

On completion of the subroutine of FIG. 19, control passes to the final step of the flow chart of FIG. 2, namely step S50, in which the gear (ratio) is decided based on the selected map (the one to be switched to or held) using the vehicle speed and throttle opening as address data. As the method for achieving this is well known and is not a feature of the present invention, it will not be explained further here.

Figure 23:
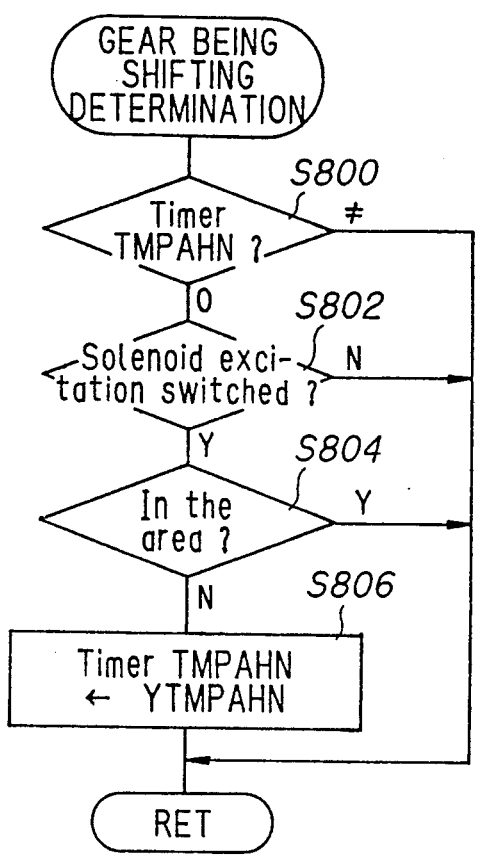
FIG. 23 is a flow chart showing subroutine for determining as to whether gear shifting is in progress.

Here, the subroutine of determination as to whether or not gear shifting is in progress referred to earlier with respect to S32 of FIG. 2 flow chart will be explained with reference to a flow chart shown in FIG. 23.

Figure 24:
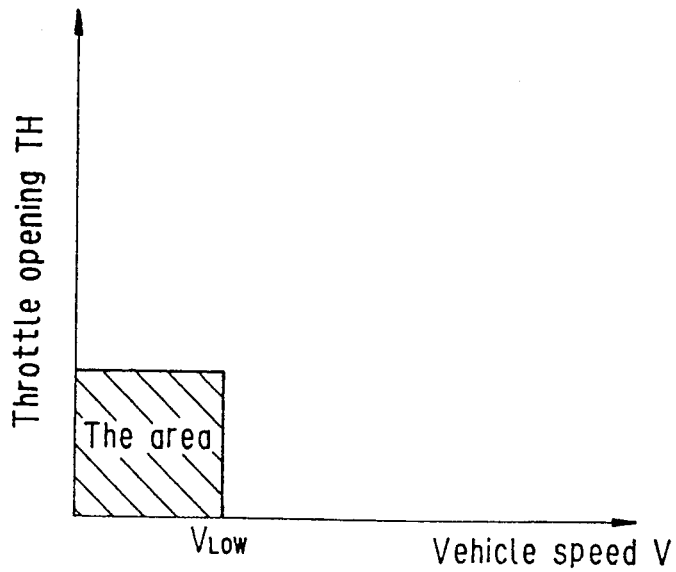
FIG. 24 is an explanatory view showing an area used in FIG. 23 flow chart.

After confirming at step S800 that the value of the aforesaid timer TMPAHN has reached zero so that gear shifting is not in progress, control passes to step S802 in which it is checked if the excitation pattern of the solenoid valves 54, 56 has switched. If it does, control passes to step S804 in which it is determined if the current engine operating condition is within a predetermined area and if not, to advance to step S806 wherein the timer is set to a prescribed value YTMPAHN and is started. FIG. 24 illustrates the predetermined area. As illustrated, the area is an engine operating region defined by a small throttle opening degree and a low vehicle speed VLOW. Since the engine output torque is low in the area, to continue the weighted average calculation does not have a bad influence on this shift control during hill climbing or hill descending. It is arranged such that, therefore, only when the solenoid valves' excitation pattern changes if engine's operating condition is out of the area shown in FIG. 24, the timer is started. As a result, the average calculation is suspended in the procedures of FIG. 2 flow chart and instead, the value calculated at the preceding cycle is used. It should be noted here that a speed ratio in the transmission may be used to detect if gear shifting is in progress.

As will be understood from the foregoing description, the present embodiment of the invention calculates the predicted acceleration as an index of the vehicle running resistance, compares the predicted acceleration with the actual acceleration, estimates the road profile (slope) from the result of the comparison, and switches among level-road running, hill climbing and hill descent maps based on the estimated road profile. Moreover, since the calculation of the average difference values used for the comparison is discontinued in a situation such as when the throttle opening is changing rapidly, errors in map selection are prevented. As the calculation of the predicted acceleration is limited to only that for third gear, a simple arrangement suffices, and, in addition, since the switching between maps is decided on the basis of the weighted average of the difference between the predicted acceleration and the actual acceleration, stable control is possible even in the specific condition.

Figure 25:
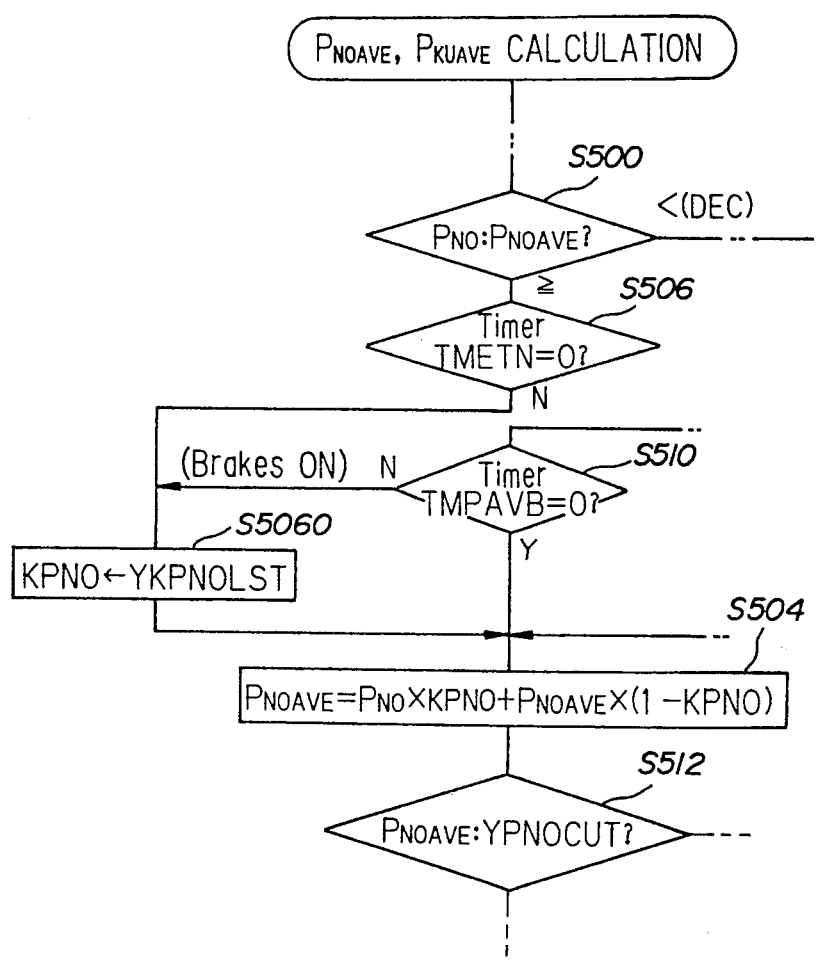
FIG. 25 is a portion of subroutine flow chart for showing another calculation of the weighted average according to a second embodiment of the invention.

The essential portion of a second embodiment of the invention is shown by the flow chart of FIG. 25, which is similar to the flow chart of FIG. 14 in the first embodiment. In this second embodiment, when step S506 finds from the value of the timer TMETN that throttle opening is changing rapidly, control passes to step S5060 in which the smoothing coefficient KPNO is set to YKPNOLST, whereafter the average value is calculated in step S504 in accordance with the indicated equation. The coefficient YKPNOLST is set to a very small value such as 0.01. As a result, since the value for the current cycle calculated in step S504 does not substantially reflect the average value, the effect is the same as that obtained in the first embodiment by not conducting the calculation and holding the value in the preceding cycle. The same also applies when step S510 determines that braking is in progress. Moreover, when it is found in steps S520 and S522 (not shown in FIG. 22 but the same as those in FIG. 14) that the throttle opening is changing rapidly, a very small negative smoothing coefficient is used with similar effect.

Figure 26:
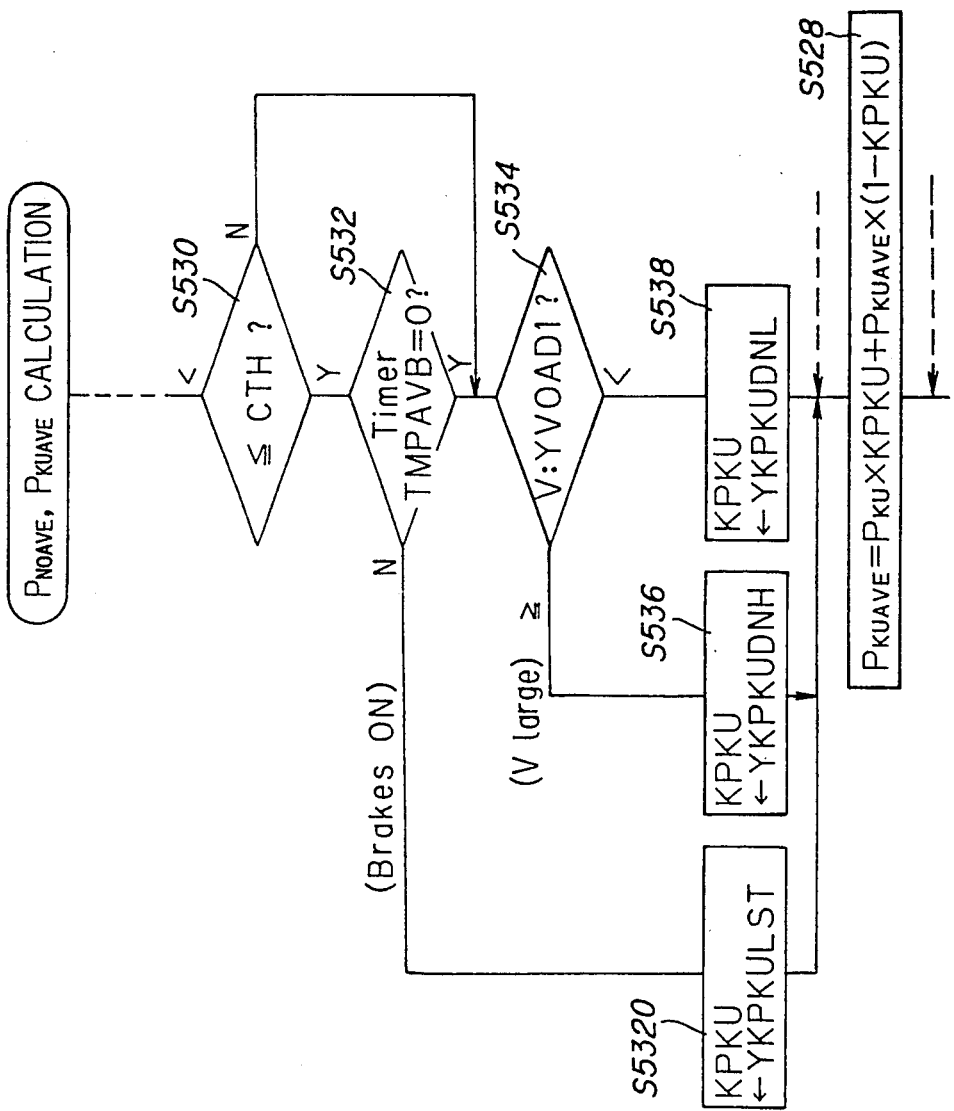
FIG. 26 is a portion of subroutine flow chart similar to FIG. 25, but shows still another calculation of the weighted average according to a third embodiment of the invention.

A third embodiment of the invention will be explained with reference to FIG. 26 which is a portion of FIG. 14. The third embodiment is very similar to the second embodiment. More specifically, when step S532 in the flow chart, which is almost identical to FIG. 14, finds braking is in progress, control passes to step S5320 in which the smoothing coefficient KPKU is set to YKPKULST, whereafter the average value is calculated in step S528 as before mentioned. The coefficient YKPKULST is a very small value such as 0.01 similarly to that in the second embodiment so as to bring out the same effect as that in the second embodiment. Needless to say, the same also applies to a situation when step S510 in FIG. 14 flow chart determines braking is in progress.

Figure 27:
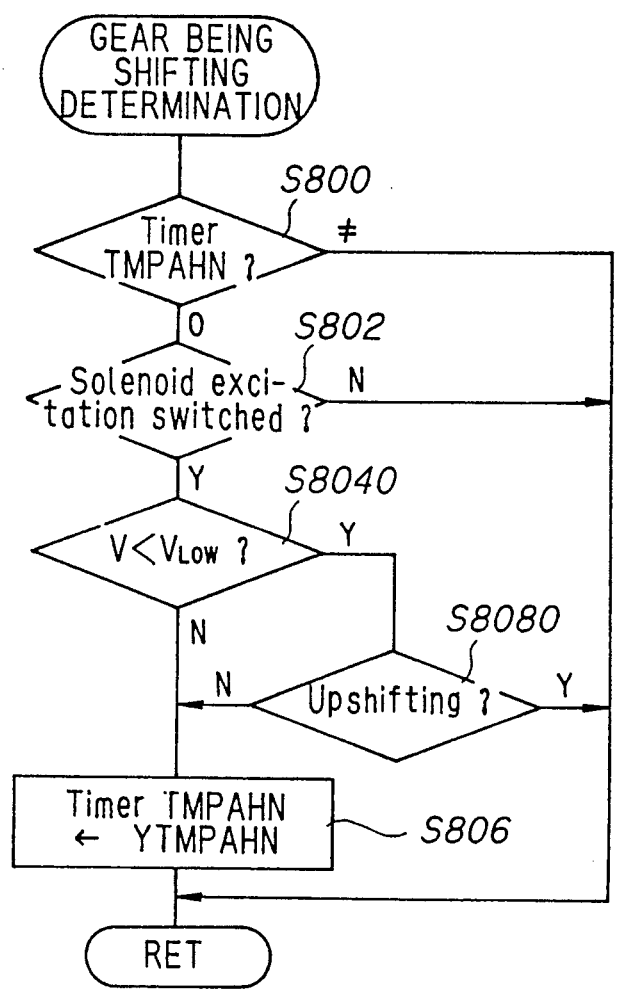
FIG. 27 is a flow chart similar to FIG. 23, but shows another determination as to whether gear shifting is in progress according to the fourth embodiment of the invention.

FIG. 27 shows a fourth embodiment of the invention. The fourth embodiment relates to an alternative technique to determine whether or not gear shifting is in progress. That is, after confirming at step S800 that the timer value has reached zero and the solenoid valves have changed their excitation pattern, control passes to step S8040 in which the vehicle speed is compared with the reference value VLOW of the aforesaid area shown in FIG. 24 in which the engine output torque is low. If step S8040 finds that the vehicle speed exceeds the reference value, control passes to step S806 to start the timer. On the contrary, if it is found in step S8040 that the vehicle speed is less than the reference value, control passes to step S8080 to determine if the gear shift is to be upshifted and moves to step S806 only when the gear is being shifted down. With the arrangement, since the average value calculation is carried out when the vehicle speed is less than the reference value and gear is to be shifted up, it is therefore possible to obtain the averaged value at an every control cycle when, for instance, the vehicle stops temporarily during hill descending and then starts to run down once again, so that the map will be immediately switched to that for hill descent. And in a situation other than this, that is, to be shifted in a region other than the area or to be downshifted when the vehicle speed is below the reference value, the averaged value calculation is suspended when the gear shifting is in progress as mentioned earlier and the averaged value in the preceding cycle is used, which can prevent the control value from being determined erroneously.

Figure 28:
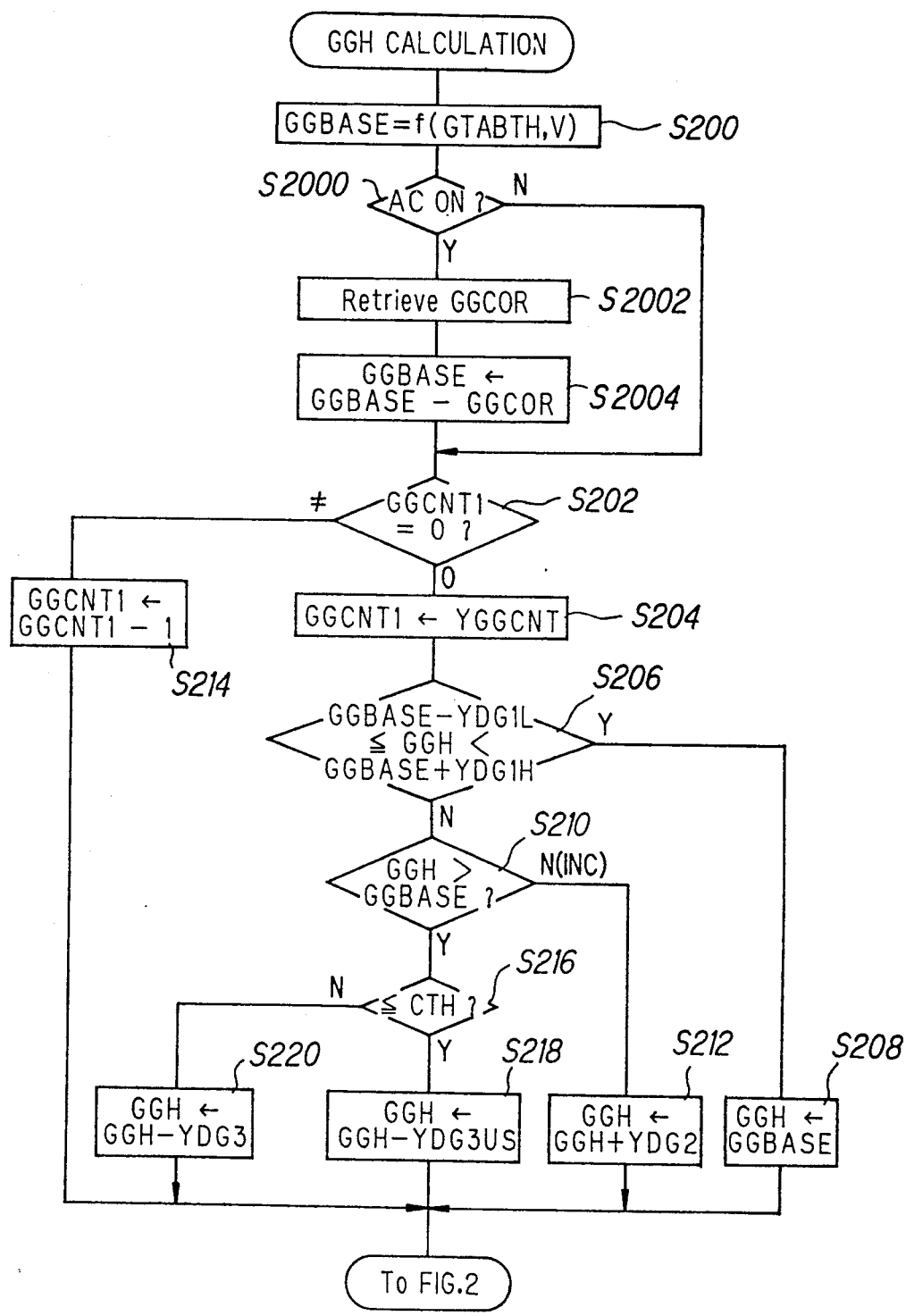
FIG. 28 is a subroutine flow chart similar to FIG. 9, but shows another calculation of the predicted acceleration according to a fifth embodiment of the invention.

FIG. 28 shows a fifth embodiment of the invention. When a vehicle is equipped with an additional apparatus such as an air conditioner driven by the vehicle engine, engine output torque is partially consumed by the apparatus in operation. Therefore, if an engine operating parameter indicative of engine load is used immediately, the index representing the running resistance can not be determined correctly and hence, proper shift control could not always be possible. In order to overcome the shortcomings, the flow chart of FIG. 9 is slightly altered as FIG. 28 in the fifth embodiment.

Figure 29:
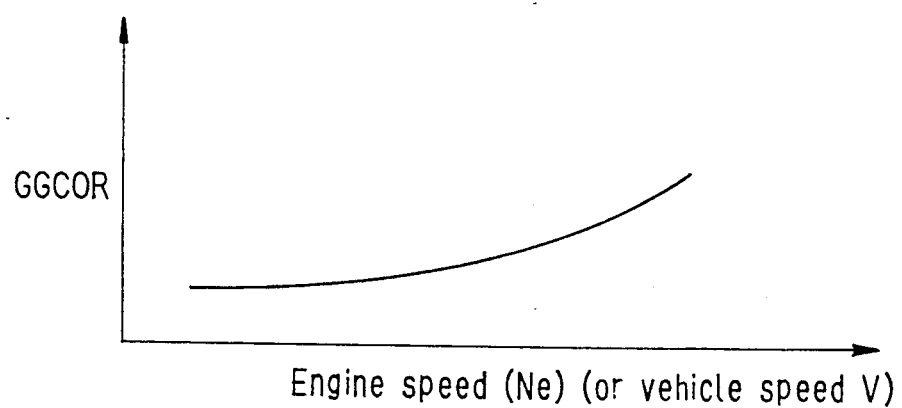
FIG. 29 is an explanatory view showing the characteristics of a correction value used in FIG. 28 flowchart.

In the flow chart, after retrieving the value GGBASE, control then passes to step S2000 in which a check is made as to whether or not an air conditioner switch is made ON. As illustrated in FIG. 1 by a phantom line, the air conditioner switch is provided and is turned on when an air conditioner equipped with the vehicle is switched on. When step S2000 finds that the air conditioner, not shown, is in operation, control advances to step S2002 in which a correction value GGCOR is retrieved from a table. FIG. 29 shows the characteristics of the table and as shown, the correction value is retrieved using the current engine speed as address datum. Control then passes to step S2004 in which the retrieved value is corrected by subtracting the correction value therefrom, and then passing to step S202 and thereafter, the predicted acceleration GGH is determined in the same manner as was described in the first embodiment. When step S2000 does not find that the air conditioner is in operation, the steps S2002 and S2004 are skipped. The reason why the correction value GGCOR is set to increase in approximately proportion as the engine speed increases is that, because a driven speed of a compressor of the air conditioner is increased as the engine speed rises, in other words, engine output consumption by the air conditioner becomes greater as the engine speed increases due to friction of the compressor. Although the engine speed is used for determining the correction value GGCOR, it will alternatively be possible to determine the value using vehicle speed or the like.

Figure 30:
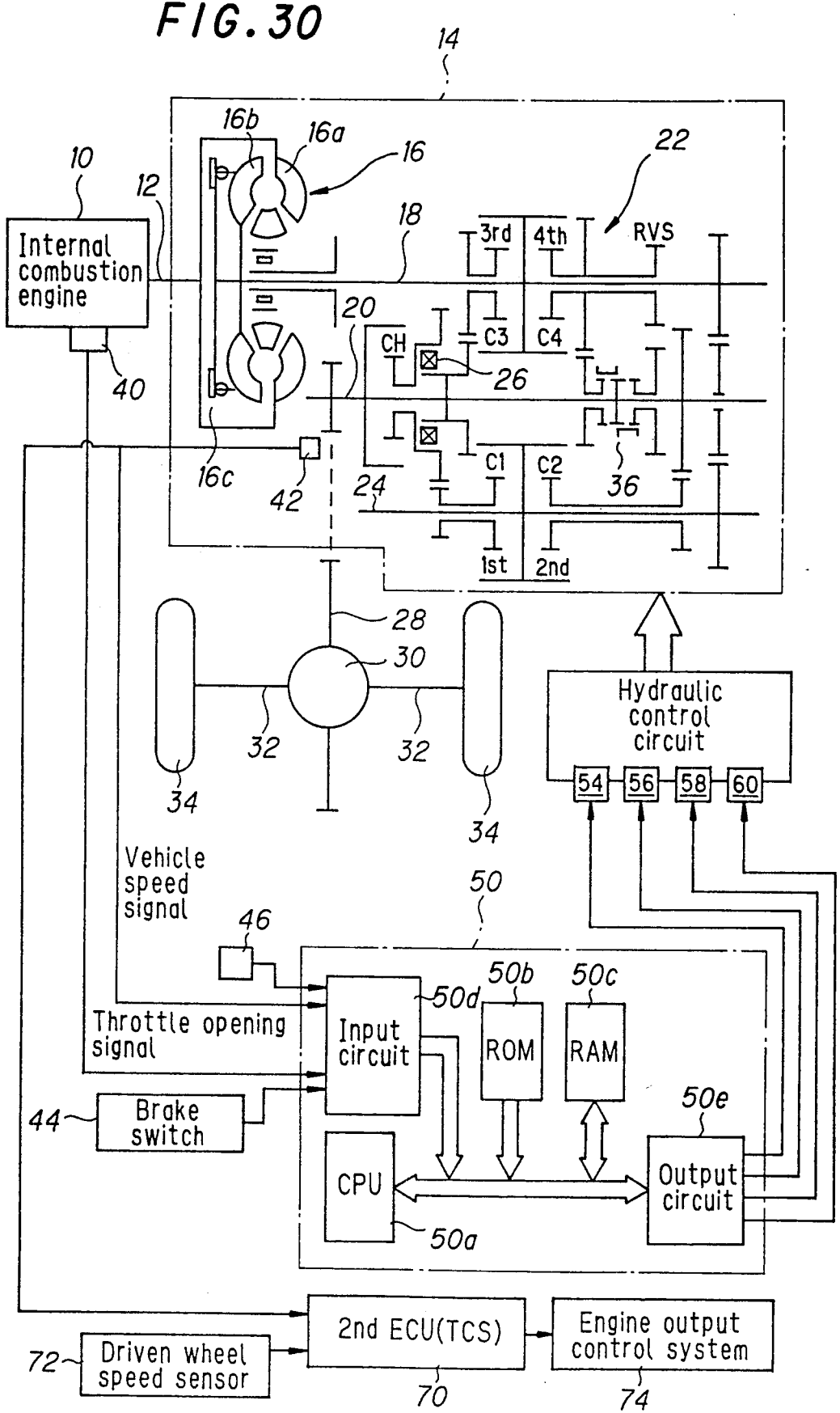
FIG. 30 is a view similar to FIG. 1, but shows another control system according to a sixth embodiment of the invention.

FIG. 30 and thereafter shows a sixth embodiment of the invention. When the vehicle speed is determined through a rotational speed of a vehicle driving wheel in the aforesaid control, as was detected through the speed of the transmission counter shaft in the first embodiment, a detected value may be different from a true vehicle traveling speed if the drive wheel is being slipped. This could be a bar to determine the index indicative of running resistance and as a result, the gear shift control could be erred. Moreover, a traction control system, hereinafter referred to as "TCS", has been proposed to control a tractional force of a vehicle in such a drive wheel slippage situation. And when the vehicle is equipped with the TCS and if the TCS operates so frequently, it can be inferred that the vehicle is running on a road condition which none of the aforesaid maps do not expect. The sixth embodiment aims to solve these problems.

FIG. 30 shows the control system according to the sixth embodiment. Differing from that in the first embodiment illustrated in FIG. 1, a second ECU (electronic control unit) 70 is additionally provided for traction control. The ECU 70 receives an output of a speed sensor 72 which detects a rotational speed of driven (free) wheels, not shown, of the vehicle and the output of the sensor 42 detecting the rotational speed of the transmission counter-shaft 20 which is proportional to the speed of the vehicle drive wheels 34, and based on them, calculates a speed ratio between the drive wheels 34 and the driven wheels. The ECU 70 determines the drive wheels are slipping if the calculated ratio is found to exceed a prescribed reference value and controls a fuel injection control system, an ignition timing control system and the like generally expressed as engine output control system 74 in the figure. The ECU 70 has a the same structure as the ECU 50 and they are connected to communicate with each other.

Figure 31:
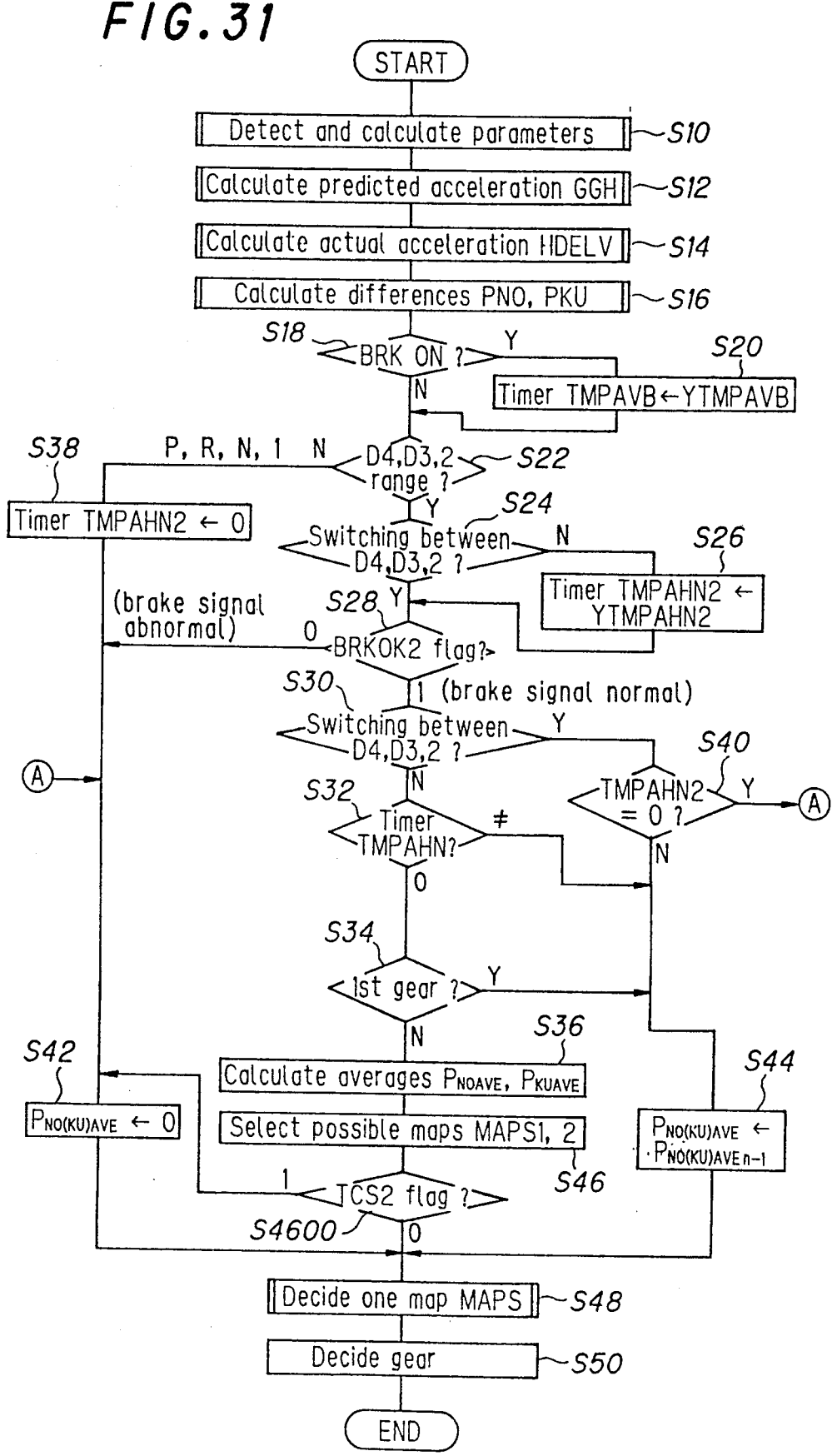
FIG. 31 is a flow chart similar to FIG. 2, but shows a main flow chart of the operation of the system shown in FIG. 30 according to the sixth embodiment of the invention.
Figure 32:
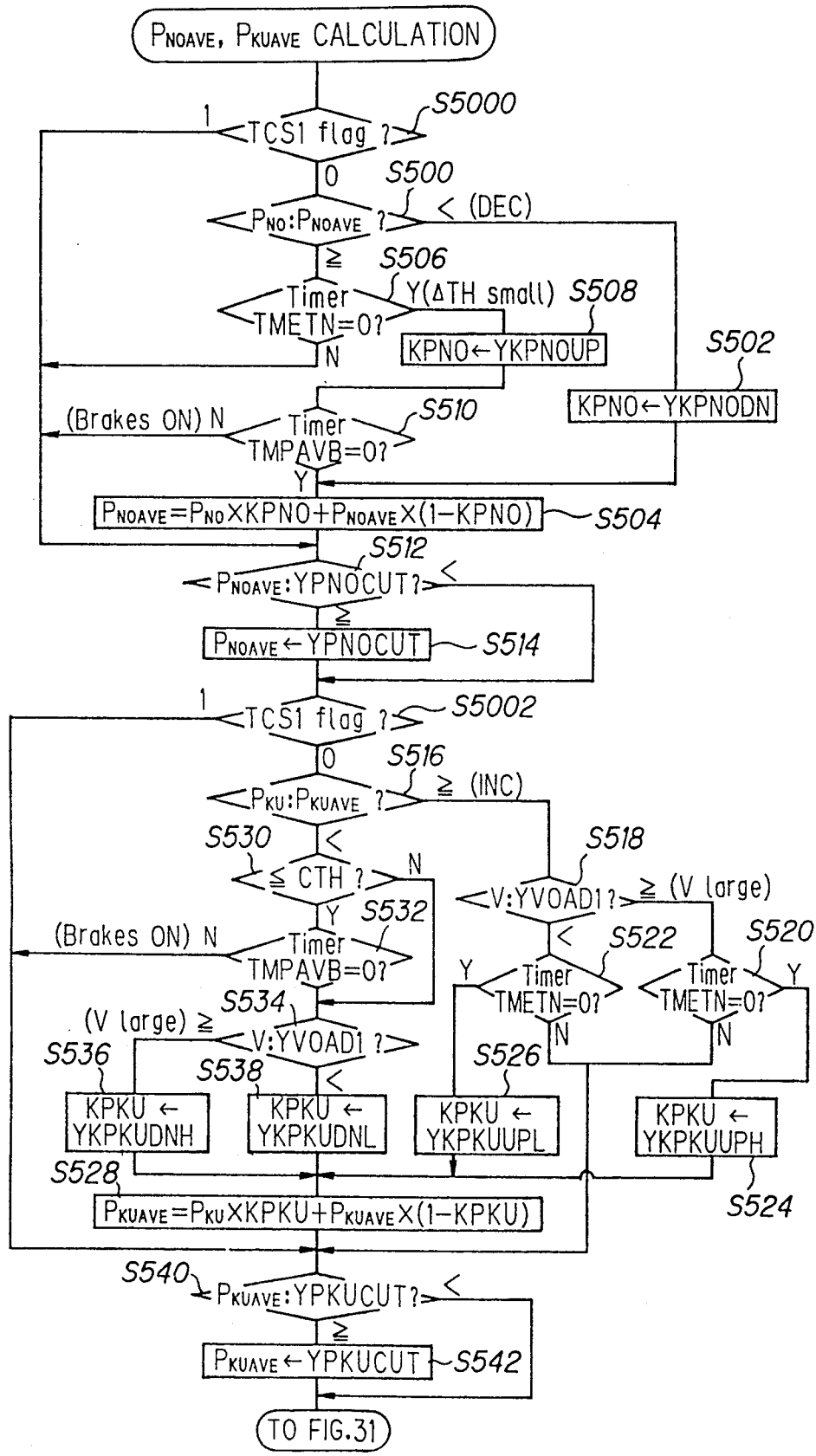
FIG. 32 is a flow chart similar to FIG. 14, but shows calculation of the weighted average according to the sixth embodiment of the invention.

FIG. 31 is a main flow chart of the control system according to the sixth embodiment. Tracing steps S10 to S34 in the flow chart similarly to the first embodiment, control passes to step S36 to calculate the average values PNOAVE, PKUAVE. FIG. 32 is a subroutine flow chart for the calculation which is identical to the flow chart of FIG. 14 in the first embodiment except that steps S5000 and S5002 are added. Namely, it is checked at the first step for calculating the average value for hill climbing (S5000) or hill descending (S5002), if a bit of a flag TCS1 is set to be ON (1) or OFF (0). The flag bit is turned ON in the second ECU 70 when the TCS is in operation and the checking is carried out in the first ECU 50 by communicating with the ECU 70. If it is found at step S5000 or S5002 that the flag bit is ON, i.e., the TCS is in operation, steps S500 to S510 or steps S516 to S538 are skipped. As a result, the calculation is suspended and the average value PNOAVE(PKUAVE)n-1 in the preceding cycle is continually used to select a map. This means that the map currently being used will not be changed, since the average value is not changed. With the arrangement, even if the drive wheels slip, no error could arise in the average value calculation and hence in the map selection. Needless to say, control passes to step S500 and thereafter or to S516 and thereafter to calculate the average value if the flag bit is found to be zero in these steps.

Returning to FIG. 31, control then passes, via step S46, to step S4600 in which a check as to whether or not a bit of a second flag TCS2 is set to be ON is again made by communicating with the second ECU 70. The second flag TCS2 is turned its ON in the second ECU when frequency or repetition cycles that the TCS operates (the number of times at which the TCS operates in a predetermined period) becomes larger than a reference value predetermined. And when step S4600 finds that the flag bit is ON, control passes to step S42 in which the average value is forcibly made zero, and the map for level-road running will then be selected. This means that the aforesaid hill climbing or hill descending control is substantially discontinued. Since such a condition as is experienced with frequent operation of TCS can be presumed that the vehicle is running on a road such as an iced road whose surface friction coefficient is quite small, and the aforesaid maps have not expect traveling on such a road. Although the map for level-road running is selected at that situation, it is preferable to prepare a sixth map in advance and to select the map for gear shifting. The six map will have the characteristics in which higher gear range is made broader or in which a vehicle can be easily started at second gear. In FIG. 31 flow chart, if step S4600 finds that the flag bit is zero, control passes to step S48 and thereafter as similarly to the first embodiment.

While five types of maps are used in the embodiments explained in the foregoing, it is alternatively possible to reduce the number of maps used by using the same map for moderate hill climbing and moderate hill descent. It is also alternatively possible to use only a single map and to adjust the characteristics in accordance with the average value of the difference between the predicted acceleration and the actual acceleration.

In addition, while the described embodiments use the acceleration as parameter indicating running resistance, the invention is not limited to this and it is alternatively possible to use any other parameter which provides an index of the running resistance, particularly of the slope resistance. Further, while the actual acceleration was calculated from the vehicle speed, it is alternatively possible to employ an acceleration sensor for detecting it directly.

As the parameter indicating engine load it is alternatively possible to use the amount of depression of the accelerator pedal instead of the throttle opening used in the described embodiments.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an automatic transmission of a vehicle, having an internal combustion engine connected to said automatic transmission for driving one or more wheels of said vehicle, comprising:

a hydraulic control circuit connected to said automatic transmission, an electronic control means for controlling said automatic transmission through said hydraulic control circuit;

a load detecting means for detecting an operating load on said engine and sending a first output signal representing the engine load to said electronic control means; and a vehicle speed detecting means for detecting the vehicle speed and sending a second output signal representing the vehicle speed to said electronic controls means, wherein said electronic control means computes an index indicative of a running resistance of the vehicle based on said first signal, and compares said index with a pre-determined reference value stored in a memory in said electronic control means to determine if the vehicle is hill climbing or hill descending; said electronic control means actuating said hydraulic control circuit for carrying out gear shifting control including changing the gear shifting characteristics of said transmission to be suitable for either hill climbing or hill descending based on said determination, and wherein said electronic control means discontinues gear shifting control for hill climbing or hill descending whenever a pre-determined condition of the operation of said vehicle is detected.

2. A system according to claim 1, wherein said pre-determined condition is a condition in which the engine load changes abruptly.

3. A system according to claim 1, wherein said pre-determined condition is a condition in which braking is in progress.

4. A system according to claim 3, wherein the braking is determined to be in progress for a predetermined period after a brake pedal was released.

5. A system according to claim 1, wherein said pre-determined condition is a condition in which a gear shifting is in progress.

6. A system according to claim 5, wherein said electronic control means continues the gear shifting control for hill climbing or hill descending if a gear is to be upshifted at a vehicle speed less than a pre-determined speed even when a gear shifting is in progress.

7. A system according to claim 1, further comprising an apparatus driven by said engine, wherein said pre-determined condition is a condition in which the apparatus is driven by the vehicle engine.

8. A system according to claim 1, further comprising a traction control system, wherein said pre-determined condition is a condition in which the traction control is in operation.

9. A system according to claim 1, wherein said automatic transmission includes a plurality of range gear positions manually switched by a driver, wherein said pre-determined condition is a condition in which the range gear is being switched between the positions.

10. A system according to claim 1, wherein said pre-determined condition is a condition in which the engine load increases beyond a pre-determined load when the vehicle is determined to be hill descending.

11. A system according to claim 10, wherein said electronic control means determines a gear shifting characteristic which has its upshifting point at a first position set relatively high with respect to the vehicle speed when the vehicle is determined to be hill descending, and when the engine load increases beyond the pre-determined load, said electronic control means forcibly changes the gear shifting characteristic to have its upshifting point at a second position set lower than said first position with respect to the vehicle speed.

12. A system according to claim 1, wherein said electronic control means obtains said index indicative of a running resistance of the vehicle cyclically at every prescribed interval and discontinues obtaining said first index when the vehicle operation is in said pre-determined condition, and said electronic control means reuses said index obtained at the preceding cycle for comparison.

13. A system for controlling an automatic transmission of a vehicle, having an internal combustion engine connected to said automatic transmission or driving one or more wheels of said vehicle, comprising:

a hydraulic control circuit connected to said automatic transmission, an electronic control means for controlling said automatic transmission through said hydraulic control circuit;

load detecting means for detecting an operating load on said engine and sending a first output signal representing the engine load to said electronic control means; and vehicle speed for detecting means for detecting the vehicle speed and sending a second output signal representing the vehicle speed to said electronic control means;

wherein said electronic control means predicts an acceleration of the vehicle as a function of said first output signal and said second output signal, determines an actual acceleration of said vehicle as a function of the detected vehicle speed, compares the actual acceleration with the predicted acceleration, changes a gear shifting characteristic in response to the comparison result, and actuates said hydraulic control circuit for performing gear shifting control in accordance with the changed gear shifting characteristic, and wherein said electronic control means discontinues changing the gear shifting characteristic when the vehicle is in the pre-determined mode of operation.

14. A system according to claim 13, wherein said pre-determined mode of operation is a mode in which the engine load changes abruptly.

15. A system according to claim 13, wherein said pre-determined mode of operation is a mode in which a braking is in progress.

16. A system according to claim 15, wherein the braking is determined to be in progress for a predetermined period after a brake pedal was released.

17. A system according to claim 13, wherein said pre-determined mode of operation is a mode in which a gear shifting is in progress.

18. A system according to claim 17, wherein said electronic control means continues the gear shifting control for hill climbing or hill descending if a gear is to be upshifted at a vehicle speed less than a predetermined speed even when a gear shifting is in progress.

19. A system according to claim 13, further comprising an apparatus driven by said engine, wherein said pre-determined mode is a mode in which the apparatus is driven by the vehicle engine.

20. A system according to claim 13, further comprising a traction control system, wherein said pre-determined mode is a mode in which the traction control is in operation.

21. A system according to claim 13, wherein said automatic transmission includes a plurality of range gear positions manually switched by a driver, wherein said pre-determined mode is a mode in which the range gear is being switched between the positions.

22. A system according to claim 13, wherein said pre-determined mode is a mode in which the engine load increases beyond a pre-determined load when the vehicle is determined to be hill descending.

23. A system according to claim 22, wherein said electronic control means determines a gear shifting characteristic which has its upshifting point at a first position set relatively high with respect to the vehicle speed when the vehicle is determined to be hill descending, and when the engine load increases beyond the pre-determined load, said electronic control means forcibly changes the gear shifting characteristic to have its upshifting point at a second position set lower than said first position with respect to the vehicle speed.

24. A system according to claim 13, wherein said electronic control means compares the actual acceleration with the predicted acceleration cyclically at a prescribed interval and discontinues the comparison when the vehicle operation is in said pre-determined mode; and wherein said electronic control means reuses the comparison result obtained at the preceding cycle for selection.

25. A system for controlling an automatic transmission of a vehicle, having an internal combustion engine connected to said automatic transmission or driving one or more wheels of said vehicle, comprising:
- a hydraulic control circuit connected to said automatic transmission,
- an electronic control means for controlling said automatic transmission through said hydraulic control circuit;
- load detecting means for detecting an operating load on said engine and sending a first output signal representing the engine load to said electronic control means; and
- vehicle speed for detecting means for detecting the vehicle speed and sending a second output signal representing the vehicle speed to said electronic control means;
- wherein said electronic control means predicts an acceleration of the vehicle as a function of said first output signal and said second output signal,
- wherein said electronic control means determines an actual acceleration of said vehicle as a function of said second output signal representing the detected vehicle speed, compares the actual acceleration with the predicted acceleration cyclically at a prescribed interval, changes a gear shifting characteristic in response to the comparison result, and actuates said hydraulic control circuit for performing gear shifting control in accordance with the changed gear shifting characteristic,
- wherein said electronic control means calculates a difference between the actual acceleration and the predicted acceleration and adds a difference to a value calculated at a preceding cycle to obtain a weighted average therebetween and compares the weighted average with a reference value; and
- wherein said electronic control means changes a coefficient of the weight when the vehicle operation is in a pre-determined mode.

26. A system according to claim 25, wherein said pre-determined mode is a mode in which the engine load changes abruptly.

27. A system according to claim 25, wherein said pre-determined mode is a mode in which a braking is in progress.

28. A system according to claim 27, wherein the braking is determined to be in progress for a predetermined period after a brake pedal was released.

29. A system according to claim 25, wherein said electronic control means predicts the acceleration from a value obtained by smoothing the determined value.

30. A system according to claim 25, wherein said electronic control means determines the acceleration from a value obtained by smoothing the determined value.

31. A system according to claim 25, wherein said electronic control means changes a coefficient of the weight if the average is increasing or decreasing.

32. A system according to claim 25, wherein said electronic control means compares the weighted average with an upper limit value and, if the weighted average exceeds the upper limit value, restricts the weighted average to the upper limit value.

33. A system according to claim 25, wherein said electronic control means discontinues changing a characteristic if downshifting occurs when the characteristic is changed.

34. A system according to claim 33, wherein said electronic control means still continues changing a characteristic if it is presumed that the driver desires a rapid deceleration.

35. A system for controlling an automatic transmission for a vehicle, having an internal combustion engine connected to said automatic transmission or driving one or more wheels of said vehicle, comprising:
- a hydraulic control circuit connected to said automatic transmission;
- an electronic control means for controlling said automatic transmission through said hydraulic control circuit;
- load detecting means for detecting an operating load on said engine and sending a first output signal representing the engine load to said electronic control means; and
- vehicle speed for detecting means for detecting the vehicle speed and sending a second output signal representing the vehicle speed to said electronic control means;
- wherein said electronic control means predicts an acceleration of the vehicle as a function of said first output signal and said second output signal,
- wherein said electronic control means determines an actual acceleration of the vehicle as a function of said second output signal representing the detected vehicle speed with respect to the same gear,
- wherein said electronic control means compares the actual acceleration with the predicted acceleration to obtain a difference therebetween cyclically at a prescribed interval and adds the difference to a difference obtained at a preceding cycle, for calculating an average therebetween, and
- wherein said electronic control means compares the average with a reference value to change a gear shifting characteristic and actuates said hydraulic control circuit for performing gear shifting control in accordance with the changed gear shifting characteristic.

36. A system according to claim 35, wherein said electronic control means predicts the acceleration from a value obtained by smoothing the determined value.

37. A system according to claim 35, wherein said electronic control means determines the acceleration from a value obtained by smoothing the determined value.

38. A system according to claim 35, wherein said electronic control means changes a coefficient of the weight if the average is increasing or decreasing.

39. A system according to claim 35, wherein said electronic control means compares the weighted average with an upper limit value and, if the weighted average exceeds the upper limit value, restricts the weighted average to the upper limit value.

40. A system according to claim 35, wherein said electronic control means discontinues changing a characteristic if downshifting occurs when the characteristic is changed.

41. A system according to claim 40, wherein said electronic control means continues changing a characteristic if it is presumed that the driver desires a rapid deceleration.

* * * * *

UNITED STATES PATENT AND TRADEMARK OFFICE
CERTIFICATE OF CORRECTION

PATENT NO. : 5,317,937
DATED : June 7, 1994
INVENTOR(S) : Yoshizawa, et al

It is certified that error appears in the above-indentified patent and that said Letters Patent is hereby corrected as shown below:

Column 20, line 61, "controls" should read --control--.

Column 21, line 65, "or" should read --for--.

Column 22, line 8, delete "for" (1st occurrence)

Column 23, line 12, "or" should read --for--.
         line 23, delete "for".

Column 24, line 13, "or" should read --for--.
         line 24, delete "for" (1st occurrence)

Signed and Sealed this

Twenty-fifth Day of April, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.:   5,317,937
DATED :       June 7, 1994
INVENTOR(S):  YOSHIZAWA et al.

It is certified that error appears in the above-identified patent and that said Letters Patent is hereby corrected as shown below:

Column 20, line 64, "first" should read --second--.

Signed and Sealed this

Nineteenth Day of March, 1996

Attest:

BRUCE LEHMAN

Attesting Officer

Commissioner of Patents and Trademarks